United States Patent [19]

Toaba et al.

[11] Patent Number: 4,521,565
[45] Date of Patent: Jun. 4, 1985

[54] AQUEOUS DISPERSION

[75] Inventors: Hirotaka Toaba, Ohimachi; Masatoshi Mikumo, Kamiitabashi; Masahiro Asami, Ohimachi, all of Japan

[73] Assignee: Daicel Chemical Industries, Ltd., Osaka, Japan

[21] Appl. No.: 521,866

[22] Filed: Aug. 10, 1983

Related U.S. Application Data

[62] Division of Ser. No. 337,336, Jan. 6, 1982, Pat. No. 4,415,703.

[30] Foreign Application Priority Data

Jan. 13, 1981 [JP] Japan .................................. 56-3506
Jan. 13, 1981 [JP] Japan .................................. 56-3507
Apr. 16, 1981 [JP] Japan .................................. 56-57500
Aug. 28, 1981 [JP] Japan .................................. 56-135939

[51] Int. Cl.³ .......................................... C08G 59/02
[52] U.S. Cl. .......................................... 525/64; 525/63; 525/65; 527/314

[58] Field of Search ...................... 525/63, 64, 65; 527/314, 313, 315

[56] References Cited

U.S. PATENT DOCUMENTS 4,085,168 4/1978 Milkovich et al. ................ 524/910

Primary Examiner—John Kight
Assistant Examiner—Nathan M. Nutter
Attorney, Agent, or Firm—Flynn, Thiel, Boutell and Tanis

[57] ABSTRACT

A cellulose derivative-containing aqueous dispersion which is obtained by polymerizing a mixture of a cellulose derivative, at least one radical-polymerizable unsaturated monomer capable of dissolving the cellulose derivative therein and water under radical polymerization conditions, said aqueous dispersion containing as a dispersion stabilizer a water-soluble or water-dispersible polymer in which polymeric chain group compatible with the polymer obtained said radical-polymerizable unsaturated monomer is chemically bonded onto a hydrophilic polymeric chain group.

12 Claims, No Drawings

AQUEOUS DISPERSION

This is a division of application Ser. No. 337,336 filed Jan. 6, 1982, now U.S. Pat. No. 4,415,703.

The present invention relates to a cellulose derivative-containing aqueous dispersion which is stable to addition of a solvent, a plasticizer, a water-soluble resin or the like.

As the process for the preparation of a cellulose derivative-containing emulsion, there can be mentioned a process disclosed in Japanese Patent Application Laid-Open Specification No. 28188/76. A coating of a cellulose-containing emulsion obtained according to this process is excellent in the gasoline resistance, polishing property and luster and is superior to conventional emulsion coatings in the anti-blocking property and other properties. This emulsion, however, is still insufficient in that since the emulsion contains a cellulose derivative, the film-forming temperature is high and in order to form a film at a low temperature (0° to 20° C.), it is ordinarily necessary to use an organic solvent as a film-forming assistant. For this purpose, ordinarily, there are preferably used ethylene glycol n-butyl ether acetate and diethylene glycol n-butyl ether acetate, and if other organic solvents are used, the stability of the emulsion is often degraded after addition of the organic solvents.

Furthermore, in order to improve the flowability of the emulsion at the coating step, an alcohol type solvent is often added, and when a pigment paste is prepared by using this emulsion, in order to enhance the dispersibility of a pigment, a water-soluble organic solvent or a water-soluble resin containing an amine or the like as a neutralizing agent is often incorporated. The above-mentioned conventional cellulose derivative-containing emulsion becomes unstable on addition of such additives, especially water-soluble organic solvents. More specifically, when a water-soluble organic solvent such as ethylene glycol monobutyl ether, isopropyl alcohol, acetone or diethylethanolamine is added in an amount of 5 to 10 parts by weight per 100 parts by weight of the cellulose derivative-containing emulsion, cohesion failure is caused in the cellulose derivative-containing emulsion and the emulsion is fatally defective as a high grade paint for which are required high surface smoothness, high pigment miscibility, high quick drying property and broad range compatibility. Therefore, the practical application range of the emulsion is limited.

Under such background, we made various researchers with a view to improving the stability of the above-mentioned cellulose derivative-containing emulsion to addition and incorporation of a water-soluble organic solvent by using surface active agents ordinarily used, but a cellulose derivative-containing emulsion having a highly improved stability to addition and incorporation of a water-soluble organic solvent could not be obtained. Therefore, we performed emulsion polymerization by using a water-soluble vinyl polymer as a dispersion stabilizer, and a cellulose derivative-containing emulsion having a considerably improved stability to addition and incorporation of a water-soluble organic solvent could be obtained. However, the water-soluble vinyl polymer providing an improved stability to addition and incorporation of a water-soluble organic solvent should be selected in view of the compatibility with a cellulose derivative or a polymer formed from a radical-polymerizable unsaturated monomer capable of dissolving the cellulose derivative therein. If a large amount of water-soluble organic solvent is added to the emulsion polymerization system, cohesion failure is readily caused in the emulsion and the luster of a coating of the obtained emulsion is poor, and therefore, the practical application range of the emulsion is limited.

Furthermore, there may be considered a method in which the compatibility is improved by causing grafting reaction during emulsion polymerization by introducing an unsaturated bond (carbon-to-carbon double bond) into the water-soluble vinyl polymer. However, if a great number of unsaturated bonds are introduced, occurrence of the grafting reaction is expected with a considerable probability, but if the number of the unsaturated bonds is small, occurrence of the grafting reaction is hardly expected. Moreover, if many unsaturated bonds are introduced, deterioration or yellowing of the emulsion coating by sun light or the like is caused and because of this defect, the application range is limited.

Therefore, we furthered our researchers with a view to obtaining cellulose derivative-containing emulsions having a sufficient stability to addition of water-soluble organic solvents while broadening the range of applicable water-soluble vinyl polymers, and we found that the foregoing defects can completely be eliminated by using as a dispersion stabilizer a hydrophilic reaction product between a water-soluble polymeric substance having a functional group in the molecule and a water-insoluble polymeric substance having a reactive group capable of reacting with said functional group to form a bond which is not dissociated in water and also having such a compatibility with an oily substance that said polymeric substance can be present in the state miscible with the intended polymer.

The invention relates to a cellulose derivative-containing aqueous dispersion which is obtained by polymerizing a mixture of a cellulose derivative, at least one radical-polymerizable unsaturated monomer capable of dissolving the cellulose derivative therein and water under radical polymerization conditions, said aqueous dispersion containing as a dispersion stabilizer a water-soluble or water-dispersible polymer in which polymeric chain group compatible with the polymer obtained from said radical-polymerizable unsaturated monomer is chemically bonded onto a hydrophilic polymeric chain group.

Summing up the invention, it is essential that the dispersing agent according to the invention has a hydrophilic part and a hydrophobic part which are bonded to each other in the chemical meaning. Each part may be in the form of polymer. The dispersing agent may be prepared by various procedures, such as a reaction between a hydrophilic polymer and a hydrophobic polymer, and graft or block polymerization of a monomer on a polymer.

The process according to the invention is preferred to be conducted under nitrogen gas.

In one embodiment of the invention, the dispersing agent is a reaction product obtained from a hydrophilic polymer and a polymer compatible with the polymer obtained from the monomer used.

The emulsion composition of the present invention comprising a high-molecular-weight dispersion stabilizer is low in the foaming property, as compared with emulsion compositions dispersed by ordinary ionic or non-ionic low-molecular-weight surface active agents, and the emulsion composition of the present invention is highly improved in the water resistance of the coating and the adhesion of the coating to a substrate. Moreover, the emulsion composition of the present invention is advantageous in that migration of surface active substances is remarkably controlled. Still further, since the dispersion stabilizer used in the present invention comprises a hydrophilic polymer chain portion and an oleophilic polymer chain portion, the oleophilic polymer chain portion is tightly fixed in emulsion particles while the hydrophilic polymer chain portion is present in the aqueous phase, with the result that agglomeration or cohesion of emulsion particles is prevented and stability characteristics such as mechanical stability, chemical stability and freeze stability are improved.

Moreover, the composition emulsion of the present invention retains a good tackiness-free touch of the surface of a coating on a coated article, that is an inherent characteristic of a cellulose ester-containing emulsion, and it is excellent in the gasoline resistance and polishing property. Therefore, it is expected that the resin composition emulsion of the present invention can be effectively used as a paint for wood, paper, metal, leather, plastics and construction materials and also as a printing ink, an adhesive and the like.

The cellulose derivative used for the cellulose derivative-containing aqueous emulsion of the present invention is not particularly critical, so far as the surface of a coating prepared from the emulsion composition has no tackiness but a good touch and properties of the coating such as the polishing property are improved. As typical instances, there can be mentioned esterified cellulose derivatives such as nitrocellulose, cellulose acetate butyrate, cellulose acetate propionate, cellulose sulfate and cellulose phosphate, and etherified cellulose derivatives such as methyl cellulose, ethyl cellulose, butyl cellulose, carboxymethyl cellulose and hydroxyethyl cellulose. Among these cellulose derivatives, nitrocellulose and cellulose acetate butyrate are preferred because they are commercially easily available and relatively cheap. The molecular weight of the cellulose derivative is not particularly critical, but an average molecular weight of about 5,000 to about 50,000 is preferred. If the average molecular weight of the cellulose derivative is lower than 5,000, the coating of the cellulose derivative-containing emulsion composition is often brittle, and if the average molecular weight of the cellulose derivative is higher than 50,000, the particle size of the obtained emulsion particles becomes too large and the dispersibility is reduced to some extent. In the present invention, the foregoing cellulose derivatives may be used singly or in the form of a mixture of two or more of them.

Radical-polymerizable unsaturated monomers capable of dissolving the cellulose derivative therein singly or in the form of a mixture of two or more of them can be used as the radical-polymerizable unsaturated monomer for dissolving the cellulose derivative in the present invention. Even a monomer incapable of dissolving the cellulose derivative when used singly may be used in the form of a mixture with other monomer if the mixture is capable of dissolving the cellulose derivative therein. As typical instances of the radical-polymerizable unsaturated monomer to be used in the present invention, the following compounds can be mentioned.

(1) Acrylic acid and methacrylic acid esters represented by the following general formula:

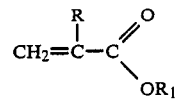

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a polyethylene glycol group, a polypropylene glycol group, a phenyl group, a benzyl group, a hydroxyalkyl group having 2 to 8 carbon atoms, a glycidyl group or a dicyclopentinyl group.

(2) Amides of acrylic acid and methacrylic acids such as acrylamide and N-methylolacrylamide.

(3) Vinyl aromatic compounds represented by the following general formula:

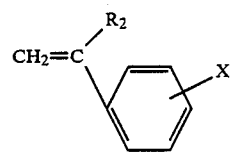

wherein $R_2$ stands for a hydrogen atom or a methyl group, and X stands for a hydrogen atom, a methyl group, a halogen atom, $-NO_2$, $-NH_2$, $-N(CH_3)_2$, $-N(C_2H_5)_2$, $-SO_3H$, $-SO_3Na$ or $-SO_3NH_4$.

(4) $\alpha,\beta$-Ethylenically unsaturated carboxylic acids such as acrylic acid, methacrylic acid, itaconic acid, maleic acid, crotonic acid, maleic anhydride and fumaric acid.

(5) Other monomers such as vinyl acetate, ethylene, butadiene, acrylonitrile, vinyl carboxylate and N-vinyl-2-pyrrolidone.

The weight ratio between the cellulose derivative and the radical-polymerizable unsaturated monomer for dissolving the cellulose derivative is not particularly critical, but it is preferred that this weight ratio be in the range of from 1/99 to 55/45. An appropriate weight ratio is selected according to the required properties of the final cellulose derivative-containing emulsion composition.

The water-soluble polymeric substance that is used for the preparation of the dispersion stabilizer in the present invention is a polymeric substance having at least one functional group selected from functional groups shown in column (B) of Table 1.

More specifically, there can be mentioned polymers formed from water-soluble radical-polymerizable unsaturated monomers such as homopolymers and copolymers of $\alpha,\beta$-ethylenically unsaturated carboxylic acid (for example, acrylic acid, methacrylic acid, crotonic acid, itaconic acid, maleic acid, maleic anhydride and fumaric acid), styrene-sulfonic acid (and its salts) and acrylic acid and methacrylic acid esters of polyalkylene glycols, and copolymers of the above-mentioned water-soluble radical-polymerizable unsaturated monomers with one or more of other radical-polymerizable unsaturated monomers.

Furthermore, water-soluble cellulose ethers such as methyl cellulose, carboxymethyl cellulose and hydroxyethyl cellulose are included.

TABLE 1

| Reactive group (A) in water-insoluble polymeric substance | Functional group (B) in water-soluble polymeric substance |
|---|---|
| 1 epoxy group | —OH, —C(=O)X (X = OH, —Cl, —Br, —NH$_2$—NHR (R = alkyl)), —C(=O)—O—C(=O)— —NH$_2$, —NHR, —SH |
| 2 acid group or acid derivative; acid group: —C(=O)OH, —C(=O)SH, —SO$_3$H, acid derivative: —C(=O)Cl, —C(=O)—O—C(=O)—, —SO$_2$Cl | N—methylol(—NH—CH$_2$OH) or N—methylol ether(—NH—CH$_2$OR) group —OH, —NH$_2$, —NHR (R = alkyl) —SH |
| 3 —OH, —NH$_2$, —NHR (R = alkyl), —SH | acid group or acid derivative —C(=O)OH, —C(=O)SH, —SO$_3$H, —C(=O)—O—C(=O)—, —C(=O)Cl, —C(=O)Br, —SO$_2$Cl |
| 4 isocyanate group | —OH, —C(=O)X (X = —OH, |

TABLE 1-continued

| Reactive group (A) in water-insoluble polymeric substance | Functional group (B) in water-soluble polymeric substance |
|---|---|
|  | —Cl, —Br, —NH$_2$ —NHR (R = alkyl)) —NH$_2$, —NHR, —SH |
| 5 active halogen | —ONa |
| 6 N—methylol or N—methylol ether group | —COOH, —OH, —NH$_2$, —NHR |
| 7 active methylene group | acid group |
| 8 cation | anion |
| 9 anion | cation |

The kind of said other radical-polymerizable unsaturated monomer is not particularly critical. Any of copolymerizable unsaturated monomers having a radical polymerizable property can be used.

As typical instances of said other radical-polymerizable unsaturated monomer, the following compounds can be mentioned.

(1) Acrylic acid and methacrylic acid esters represented by the following general formula:

$$CH_2=\underset{R}{C}-C(=O)OR_1$$

wherein R stands for a hydrogen atom or a methyl group and R$_1$ stands for an alkyl group having 1 to 20 carbon atoms, a cycloalkyl group having 5 or 6 carbon atoms, a methoxybutyl group, an ethoxybutyl group, a phenyl group, a benzyl group, an allyl group, a glycidyl group, a hydroxyalkyl group having 2 to 8 carbon atoms or a dicyclopentinyl group.

(2) Amides of acrylic acid and methacrylic acid such as acrylamide and N-methylolamide.

(3) Vinyl aromatic compounds represented by the following general formula:

$$CH_2=\underset{R_2}{C}-\text{C}_6\text{H}_4\text{X}$$

wherein R$_2$ stands for a hydrogen atom or a methyl group, and X stands for a hydrogen atom, a methyl group, a halogen atom, a nitro group, an amino group or an N-(alkyl)$_2$ group.

(4) Other monomers such as vinyl acetate, ethylene, butadiene, chloroprene, isoprene, acrylonitrile, vinyl chloride and carboxylic acid vinyl esters.

In view of the subsequent reaction with the water-insoluble polymeric substance, it is preferred that preparation of the intended water-soluble polymeric substance from the foregoing monomers be carried out by solution polymerization using a hydrophilic organic solvent. However, the preparation process is not limited to the solution polymerization process, but other known polymerization processes such as bulk polymerization, suspension polymerization and emulsion polymerization processes may be adopted.

The temperature and time customarily adopted for ordinary radical polymerization may be adopted for the above polymerization. Ordinarily, the polymerization is carried out at 0° to 200° C., especially 40° to 150° C., for about 1 to about 10 hours in the presence of a polymerization initiator, though these conditions are not critical. Known radical initiators may be used for the preparation of the water-soluble vinyl polymer. For example, there can be used radical initiators such as organic peroxides, azo compounds, sulfides, sulfines and nitrilo compounds, and redox type radical initiators. Moreover, known chain transfer agents such as mercaptans and α-methylstyrene dimer may be used.

The number average molecular weight of the so-prepared water-soluble polymeric substance is 300 to 100,000, preferably 500 to 30,000. If the number average molecular weight is lower than 300, the dispersibility is reduced, and if a polymer having a number average molecular weight higher than 100,000 if used as the dispersion stabilizer, the viscosity of the resulting emulsion is drastically increased and the emulsion polymerization operation becomes difficult.

The water-insoluble polymeric substance for formation of the dispersion stabilizer to be used in the present invention contains a reactive group shown in column (A) of Table 1 in the molecule.

Such water-insoluble polymeric substance containing at least one reactive group selected from epoxy, carboxyl, acid halide, acid anhydride, isocyanate, active halogen, N-methylol and N-methylol ether groups is a polymer consisting of at least one radical-polymerizable unsaturated monomer, which contains at least one reactive group selected from the above-mentioned reactive groups in the molecule. A polymer obtained by introducing such reactive group into a polymer of a radical-polymerizable unsaturated monomer by such a post treatment as hydrolysis is included in the polymer containing such reactive group. Ordinarily, such reactive group is introduced by homopolymerization or copolymerization of radical-polymerizable unsaturated monomers containing such reactive group, and the intended reactive group-containing polymer is thus prepared.

The kind of the radical-polymerizable unsaturated monomer used for the preparation of the water-insoluble polymeric substance is not particularly critical, so far as it contains a radical-polymerizable, ethylenically unsaturated bond ($>C=C<$). As typical instances of such polymerizable monomer, the following compounds can be mentioned.

(1) Acrylic acid and methacrylic acid esters represented by the following general formula:

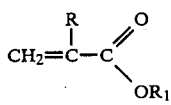

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a phenyl group, a benzyl group, an allyl group, a hydroxyalkyl group having 2 to 8 carbon atoms, a dicyclopentinyl group or a polyethylene glycol group.

(2) Amides of acrylic acid and methacrylic acid such as acrylamide and N-methylolacrylamide.

(3) Vinyl aromatic compounds represented by the following general formula:

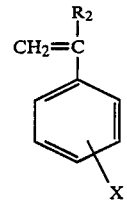

wherein $R_2$ stands for a hydrogen atom or a methyl group, and X stands for a hydrogen atom, a methyl group, a halogen atom, a nitro group, an amino group or an N-(alkyl)$_2$ group.

(4) Other monomers such as vinyl acetate, ethylene, butadiene, chloroprene, isoprene, acrylonitrile, vinyl chloride and carboxylic acid vinyl esters.

(5) Functional group-containing vinyl monomers such as glycidyl acrylate, glycidyl methacrylate, allylglycidyl ether, acrylic acid chloride, methacrylic acid bromide, acrylic acid, methacrylic acid, maleic anhydride and fumaric acid.

These unsaturated monomers may be used singly or in the form of a mixture of two or more of them. For example, a polymer obtained by partially hydrolyzing a homopolymer of an acrylic acid ester or methacrylic acid ester to introduce a carboxyl group can be used.

The reactive group-containing water-insoluble polymer may be prepared by polymerizing a monomer such as mentioned above according to a known polymerization process, for example, the solution polymerization process, the suspension polymerization process or the emulsion polymerization process and performing a necessary post treatment. Among these polymerization processes, the solution polymerization process is most preferred. The solution polymerization may be accomplished by conducting reaction in an appropriate inert solvent in the presence of a polymerization initiator (polymerization catalyst) at a reaction temperature of 0° to about 200° C., preferably 30° to 150° C. (0° to 90° C., preferably 30° to 80° C. in the case where an epoxy group-containing unsaturated monomer is used) for about 0.5 to about 20 hours, preferably about 2 to about 10 hours.

A solvent capable of dissolving the formed polymer therein is preferably used as the solvent, and when a monomer containing an epoxy group or acid halide as the reactive group, in order to prevent modification of the reactive group, it is preferred that a solvent having no active hydrogen atom be selected and used.

A known polymerization catalyst such as an azo compound, an organic peroxide, a sulfide, a sulfine, a nitroso compound or other radical initiator is used as the polymerization catalyst.

A known chain transfer agent such as a mercaptan compound or an α-methylstyrene dimer may be used.

The so-prepared reactive group-containing water-insoluble polymer has a molecular weight of about 300 to about 200,000, preferably about 300 to about 200,000.

Two or more of reactive groups may be contained in the water-insoluble polymer. However, since the water-soluble polymeric substance contains many functional groups which are water solubility-imparting groups, if the number of the reactive groups of the water-insoluble polymeric substance is increased, the number of bonds formed by these groups becomes too large, with the result that the resulting reaction product between the water-soluble polymeric substance and the water-insoluble polymeric substance loses the water solubility. Accordingly, it is preferred that the number of the reactive groups be up to about 5 per molecule of the water-insoluble polymeric substance. Two or more kinds of reactive groups need not be included in the water-insoluble polymeric substance.

Such reactive group should be selected in view of the reactivity with the functional group of the water-soluble polymeric substance. For example, combinations shown in Table 1 given hereinbefore may be used.

It is important that the water-insoluble polymeric substance should have a good compatibility with oily substances, and especially when the oily substance is a radical-polymerizable monomer as in the present invention, it is required for the water-insoluble polymeric substance to have a good compatibility not only with the polymerizable monomer but also with a polymer formed from said monomer. If this requirement is satisfied, the water-insoluble polymeric substance of the dispersion stabilizer of the present invention, that is, the oleophilic molecule chain, is entangled with the formed polymer to fix the dispersion stabilizer to the emulsion particles, while the water-soluble polymeric substance of the dispersion stabilizer of the present invention, that is, the hydrophilic molecule chain, is present in the aqueous phase to prevent agglomeration or cohesion of the emulsion particles.

Ordinarily, the mutual compatibility among polymers is manifested in very narrow ranges, and it is often difficult to dissolve different polymers in each other. In the dispersion stabilizer to be used in the present invention, the hydrophilic portion is present in the aqueous phase and the oleophilic molecule chain portion is dissolved in the monomer at the initial stage of the emulsion polymerization and is relatively easily included into the polymer formed from the monomer as the emulsion polymerization advances. However, when the compatibility is extremely poor, the oleophilic molecule chain is expelled out by the polymer formed as the emulsion polymerization advances, and the dispersion stabilizer of the present invention as a whole is sometimes separated from the emulsion particles, with the result that the dispersion stabilizer of the present invention acts only as a protecting colloid like a conventional water-soluble polymer such as polyvinyl alcohol and the intended effect cannot substantially be attained. Therefore, it is indispensable that the oleophilic molecule chain should be dissolved at least in the monomer, that is, the oleophilic molecule chain should have a compatibility with the monomer and that the oleophilic molecule chain should be miscible with the formed polymer and present in the state where it is mixed with the formed polymer. This compatibility can be foreseen, as is well known, based on the fact that the SP values (solubility parameters) of polymers are close to each other or the composition is similar in two copolymers. In view of such factors, the composition or structure of the dispersion stabilizer is determined. For example, in the case where the monomer to be polymerized is composed mainly of an acrylic acid or methacrylic acid ester (at least 50% based on the total amount), it is preferred that the oleophilic oil-soluble polymer chain of the dispersion stabilizer of the present invention be composed mainly of an acrylic acid or methacrylic acid ester. In this case, it is permissible to change the kind of the acrylic acid or methacrylic acid ester (for example, n-butyl methacrylate is used instead of methyl methacrylate) or change the kind of the small quantity monomer (for example, $\alpha$-methylstyrene is used instead of styrene).

In the case where the composition of the monomer to be polymerized is quite different from the composition of the oil-soluble polymer chain, it is preferred that the difference between the SP value of the polymer formed from the monomer and the SP value of the polymer of the oil-soluble polymer chain be less than $\pm 1.0$. If the difference of the SP value exceeds this range, the resulting emulsion is often unstable to addition of a water-soluble organic solvent like an emulsion obtained by using a water-soluble resin such as polyvinyl alcohol as the dispersion stabilizer. In the case where the composition of the monomer to be polymerized is completely the same as the composition of the oil-soluble polymer chain, both are well compatible with each other and best results are obtained. In this case, the dispersion stabilizer of the dispersion stabilizer has a structure similar to that of a polymer obtained by grafting the monomer to be polymerized, to the water-soluble polymer chain.

However, such graft polymer is different from the dispersion stabilizer synthesized by reaction between the two polymeric substances according to the present invention, because adjustment of formation of active points to the trunk polymer, growth of polymer chains from the active points and the composition is very difficult in the graft polymer, and when such graft polymer is used, it is very difficult to form a dispersion stabilizer having desired composition and structure.

In contrast, in case of the dispersion stabilizer according to the present invention, it is very easy to adjust the number of the reactive groups in the oil-soluble polymer chain, and it is sufficient if in preparing the oil-soluble polymer chain, the composition of the monomers is selected so that the number of the reactive group-containing monomers is up to about 5, preferably one, per the predetermined degree of polymerization.

The dispersion stabilizer of the present invention is prepared by bonding the above-mentioned functional group-containing, water-soluble polymeric substance and the above-mentioned reactive group-containing, water-insoluble polymeric substance by intermolecular reaction. The intended hydrophilic reaction product is obtained by mixing solution polymerization products of both the polymeric substances and carrying out the reaction at 0° to 200° C. for 1 minute to 48 hours, though the preparation process is not limited to this process. For example, the intended hydrophilic reaction product may be obtained by melt-mixing both the polymeric substances by a conventional mixing apparatus such as a hot roll mixer, a Banbury mixer or an extruder. In this case, the reaction is accomplished within 1 to 30 hours. The mixing method or reaction time is not particularly critical. A reaction promotor may be added according to need.

The so-prepared polymer may be neutralized or treated with an alkali metal hydroxide, an amine or ammonia to water-solubilize the hydrophilic polymer chain portion according to need. When the obtained hydrophilic polymer is dispersed in water, it sometimes happens that the polymer is not completely dissolved in water but provides a slightly opaque liquid. The reason is that although the hydrophilic polymer chain portion is dissolved in water, the oleophilic polymer chain portion is not dissolved in water but is dispersed in water and a slight amount of the unreacted water-insoluble polymer is present. However, since such scarcely water-soluble portion or molecule is dissolved in the monomer to be polymerized and is included in the emulsion particles, the stability of the resulting emulsion is not influenced by such scarcely water-soluble portion or molecule.

In order to obtain the aqueous dispersion of the present invention, a mixture comprising a cellulose derivative and a radical-polymerizable unsaturated monomer capable of dissolving the cellulose derivative therein is emulsion-polymerized in the presence of the so-prepared dispersion stabilizer. Known processes may be used for this emulsion polymerization, and known radical initiators and chain transfer agents may be used. Furthermore, a film-forming assistant such as a solvent or a plasticizer may be added to the emulsion polymerization system in addition to the cellulose derivative and the radical-polymerizable unsaturated monomer.

The so-prepared cellulose derivative-containing emulsion of the present invention can be widely used in the fields of general-purpose paints, adhesives, resin-processing additives and the like. Furthermore, film-forming assistants, organic solvents, plasticizers, dyes, pigments, defoaming agents, rust-preventing agents, mildew-proofing agents, water-soluble resins and cross-linking agents such as melamine may be added to the emulsion composition of the present invention in known amounts according to need. Moreover, the emulsion of the present invention may be mixed with other emulsions according to need.

When a radical-polymerizable unsaturated monomer containing a cellulose derivative dissolved therein is emulsion-polymerized by using as a dispersion stabilizer a graft polymer and/or block polymer comprising a hydrophilic polymer portion and a relatively oleophilic polymer portion having a compatibility at least with the radical-polymerizable unsaturated monomer capable of dissolving the cellulose derivative therein, preferably a good compatibility with a polymer of said radical-polymerizable unsaturated monomer, which is obtained by polymerizing a monomer in the presence of one polymer portion to form the other polymer portion, there can be obtained a cellulose derivative-containing emulsion composition which is excellent in the dispersion stability and has an excellent stability to addition and incorporation of water-soluble organic solvents, irrespectively of the kind of the cellulose derivative. We have now completed the present invention based on this finding.

The emulsion composition of the present invention is low in the foaming property, as compared with emulsion compositions dispersed by ordinary ionic or nonionic low-molecular-weight surface active agents, and the emulsion composition of the present invention is highly improved in the water resistance of the coating and the adhesion of the coating to a substrate. Moreover, the emulsion composition of the present invention is advantageous in that migration of surface active substances is remarkably controlled. Still further, since the dispersion stabilizer used in the present invention comprises a hydrophilic polymer portion and an oleophilic polymer portion, the oleophilic polymer portion is tightly fixed in emulsion particles while the hydrophilic polymer portion is present in the aqueous phase, with the result that agglomeration or cohesion of emulsion particles is prevented and stability characteristics such as mechanical stability, chemical stability and freeze stability are improved.

Moreover, the composition emulsion of the present invention retains a good tackiness-free touch of the surface of a coating on a coated article, that is an inherent characteristic of a cellulose ester-containing emulsion, and it is excellent in the gasoline resistance and polishing property. Therefore, it is expected that the resin composition emulsion of the present invention can be effectively used as a paint for wood, paper, metal, leather, plastics and construction materials and also as a printing ink, an adhesive and the like.

The polymer that is used as the dispersion stabilizer in the present invention is a graft polymer or block polymer comprising (A) a hydrophilic polymer portion and (B) a polymer portion (relatively oleophilic polymer portion) having a good compatibility with the above-mentioned radical-polymerizable unsaturated monomer capable of dissolving the cellulose derivative therein and preferably also with a polymer of said monomer, which are connected in one molecule, and this graft polymer or block polymer is obtained by polymerizing in the presence of one polymer portion a polymerizable monomer for formation of the other polymer portion.

By the "polymerizable monomer" is meant a monomer that can be polymerized by known polymer-forming reaction, for example, addition polymerization, condensation polymerization, polyaddition ring-opening polymerization, isomerization polymerization, cyclization polymerization, disassociation polymerization or addition condensation. For example, there can be mentioned polymerizable unsaturated compounds such as styrene, vinyl chloride, methyl methacrylate, acrylic acid and acrylonitrile, polymerizable cyclic compounds such as ethylene oxide, $\epsilon$-caprolactam and $\beta$-propiolactam, and polymerizable polyfunctional compounds such as terephthalic acid, ethylene glycol, adipic chloride, hexamethylene diamine, tolylene diisocyanate and dimethylsiloxane. These monomers are described in "Polymer Experiments, Volume 2, Monomers I" compiled by the Editorial Committee of Polymer Experiments, the Japanese Polymer Association (published by Kyoritsu Shuppan in 1976) and "Polymer Experiments, Volume 3, Monomers II", compiled by the Editorial Committee of Polymer Experiments, the Japanese Polymer Association (published by Kyoritsu Shuppan in 1977). Among monomers described in these literature references, those providing graft polymers or block polymers when polymerized in the presence of polymers can be used in the present invention. From the viewpoints of easiness in handling and commercial availability, addition polymerizable unsaturated monomers such as vinyl compounds, vinylidene compounds and diene compounds are ordinarily preferred.

The number average molecular weight of the polymer portion (A) of the dispersion stabilizer used in the present invention is 300 to 100,000, preferably 500 to 30,000. If the number average molecular weight is lower than 300, the dispersibility is reduced, and if a polymer having a number average molecular weight higher than 100,000 is used for the dispersion stabilizer, the viscosity of the resulting emulsion is drastically increased and the emulsion polymerization operation becomes difficult. The number average molecular weight of the polymer portion (B) is about 300 to about 200,000, preferably about 300 to about 20,000. It is important that the polymer portion (B) should have a good compatibility with oily substances, and especially when the oily substance is a radical-polymerizable monomer as in the present invention, it is required for the polymer portion (B) to have a good compatibility not only with the polymerizable monomer but also with a polymer formed from said monomer. If this requirement is satisfied, the polymer portion (B) of the dispersion stabilizer of the present invention, that is, the oleophilic molecule chain, is entangled with the formed polymer to fix the dispersion stabilizer to the emulsion particles, while the polymer portion (A) of the dispersion stabilizer of the present invention, that is, the hydrophilic molecule chain, is present in the aqueous phase to prevent agglomeration or cohesion of the emulsion particles.

The process for the preparation of a graft polymer or block polymer used as the dispersion stabilizer in the present invention by polymerizing a monomer in the presence of a polymer is not particularly critical. For example, there may be adopted known processes as disclosed in the Journal of the Japanese Polymer Association, "Polymers", 28, No. 3, pages 192–193 (published by the Japanese Polymer Association in 1979), "Polymer Experiments, Volume 6, Polymeric Reactions" compiled by the Editorial Committee of Polymer Experiments, the Japanese Polymer Association (published by Kyoritsu Shuppan in 1978), pages 148–189 and 191–192, and A. S. Hoffman and R. Bacskai, "Copolymerization (ed. by G. E. Ham)", page 335 (published by Interscience N.Y. in 1964). More specifically, there can be adopted the following processes.

(1) A process utilizing a radical mechanism, for example, utilizing an attack of a polymerization initiator radical or grown chain radical to a polymer present in advance, utilizing a polymeric initiator such as a polymeric peroxide, a polymeric azo-bis compound or a combination of a hydroxyl group-containing polymer and a cerium (IV) salt, utilizing a radical formed on a polymer molecule by irradiation of a polymer or polymer system with radioactive rays or utilizing a radical formed on a polymer molecule cut by a mechanical treatment.

(2) A process according to a mechanism utilizing an ion radical formed in a polymer molecule.

(3) A process utilizing condensing or ring-opening reaction between a functional group of a polymer and a monomer, for example, formation of a graft polymer by reacting a polymer having a functional group such as an amino, hydroxyl, carboxyl or carboxylic amide group with α-epoxide.

(4) A process utilizing copolymerization of a polymer having a polymerizable functional group on the molecule end, that is, a macromonomer, with other monomer.

The course of synthesis of the polymer used as the dispersion stabilizer according to the foregoing processes can be divided into the following two types.

I. A polymerizable monomer for formation of the polymer portion (B) is graft-polymerized and/or block-polymerized in the presence of a hydrophilic polymer.

II. A polymerizable monomer for formation of the polymer portion (A) is graft-polymerized and/or block-polymerized in the presence of a relatively oleophilic polymer having a good compatibility with a monomer formed of at least one radical-polymerizable unsaturated monomer capable of dissolving a cellulose derivative therein.

The course I of synthesis of the polymer used as the dispersion stabilizer in the present invention will now be described. As typical instances of the hydrophilic polymer to be made present, which is the polymer portion (A) of the dispersion stabilizer of the present invention, the following polymers can be mentioned.

(i) Water-soluble natural polymers such as gelatin, alginic acid, alginic acid salts, funorin and starch.

(ii) Modified cellulose water-soluble resins such as methyl cellulose, carboxymethyl cellulose, hydroxyethyl cellulose and carboxymethyl starch.

(iii) Polyalkylene glycols and derivatives thereof such as polyethylene glycol, polypropylene glycol and polyethylene glycol methacrylate.

(iv) Polymers formed from water-soluble radical-polymerizable unsaturated monomers such as homopolymers and copolymers of α,β-ethylenically unsaturated carboxylic acid (for example, acrylic acid, methacrylic acid, crotonic acid, itaconic acid, maleic acid, maleic anhydride and fumaric acid), styrene-sulfonic acid (and its salts), acrylic acid and methacrylic acid esters of polyalkylene glycols, acrylamide, methacrylate, vinylpyridine and N-vinyl-2-pyrrolidone.

(v) Copolymers of water-soluble radical-polymerizable unsaturated monomers with other radical-polymerizable unsaturated monomers, such as copolymers of at least one member selected from α,β-ethylenically unsaturated carboxylic acids (for example, acrylic acid, methacrylic acid, crotonic acid, itaconic acid, maleic acid, maleic anhydride and fumaric acid), styrene-sulfonic acid (and its salts), acrylic and methacrylic acid esters of polyalkylene glycols, acrylamide, methacrylamide, vinylpyridine and N-vinyl-2-pyrrolidone with one or more of other radical polymerizable unsaturated monomers. The kind of said other radical-polymerizable unsaturated monomer is not particularly critical. Any of copolymerizable unsaturated monomers having a radical polymerizable property can be used.

As typical instances of such radical-polymerizable unsaturated monomer, the following compounds can be mentioned.

(1) Acrylic acid and methacrylic acid esters represented by the following general formula:

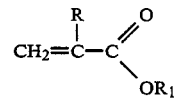

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a phenyl group, a benzyl group, an allyl group, a hydroxyalkyl group having 2 to 8 carbon atoms, a dicyclopentinyl group or a polyethylene glycol group.

(2) Vinyl aromatic compounds represented by the following general formula:

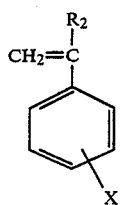

wherein $R_2$ stands for a hydrogen atom or a methyl group, and X stands for a hydrogen atom, a methyl group, a halogen atom, a nitro group, an amino group or an N-(alkyl)$_2$ group.

(3) Other monomers such as vinyl acetate, ethylene, butadiene, chloroprene, isoprene, acrylonitrile, vinyl chloride and carboxylic acid vinyl esters.

(vi) Other polymers such as polyvinyl alcohol, partially saponified polyvinyl alcohol, partially hydrolyzed vinyl acetate/acrylic acid ester or methacrylic acid ester copolymers and partially hydrolyzed polyacrylic or polymethacrylic acid ester copolymers.

The process for the preparation of these hydrophilic polymers is not particularly critical, but a hydrophilic polymer obtained by radical polymerization of a radical-polymerizable unsaturated monomer is advantageously used because the rigidity, strength, hydrophilic property and other properties of the polymer chain can easily be changed.

All of relatively oleophilic polymerizable monomers having a good compatibility with the above-mentioned radical-polymerizable unsaturated monomer capable of dissolving therein the cellulose derivative, which constitutes the particles of the cellulose derivative-containing emulsion and preferably also with a polymer of said radical-polymerizable unsaturated monomer can be used as the monomer to be polymerized in the presence of the hydrophilic polymer. These monomers may be polymerized singly or in combination. Ordinarily, it is preferred that a polymerizable monomer providing a polymer formed of at least one radical polymerizable unsaturated monomer capable of dissolving the cellulose derivative therein, which constitutes the particles of the cellulose derivative-containing emulsion composition of the present invention, be used.

As typical instances of such polymerizable monomer, the following compounds can be mentioned.

(1) Acrylic acid and methacrylic acid esters represented by the following general formula:

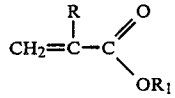

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a polyethylene glycol group, a polypropylene glycol group, a phenyl group, a benzyl group, a hydroxyalkyl group having 2 to 8 carbon atoms, a glycidyl group or a dicyclopentinyl group.

(2) Vinyl aromatic compounds represented by the following general formula:

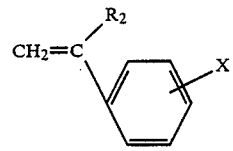

wherein $R_2$ stands for a hydrogen atom or a methyl group, and X stands for a hydrogen atom, a methyl group, a halogen atom, —NO$_2$, —NH$_2$, —N(CH$_3$)$_2$ or —N(C$_2$H$_5$)$_2$.

(3) Other monomers such as vinyl acetate, ethylene, butadiene, acrylonitrile and carboxylic acid vinyl esters.

At least one of the above-mentioned monomers is graft-polymerized and/or block-polymerized in the presence of the above-mentioned hydrophilic polymer constituting the polymer portion (A) to form a graft polymer and/or block polymer acting as the dispersion stabilizer to the present invention.

Synthesis of a polymer used as the dispersion stabilizer in the present invention according to the course II will now be described. As pointed out hereinbefore, any of polymers having a good compatibility with the polymer formed from the radical-polymerizable unsaturated monomer capable of dissolving the cellulose derivative therein can be used as the relatively oleophilic polymer (B) made present in the polymerization system, so far as the molecular weight is in the above-mentioned range. Ordinarily, however, it is preferred to use polymers obtained by polymerization of radical-polymerizable unsaturated monomers, because the physical properties and chemical properties of the polymers can be adjusted relatively easily and industrial handling of these polymer is very easy. In the present invention, it is especially preferred that a polymer formed from the radical-polymerizable unsaturated monomer capable of dissolving the cellulose derivative therein, which constitutes the emulsion particles of the cellulose derivative-containing emulsion composition of the present invention, be used as the relatively oleophilic polymer (B). As typical instances of such polymerizable monomer, the following compounds can be mentioned.

(1) Acrylic acid and methacrylic acid esters represented by the following general formula:

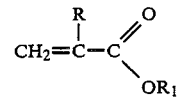

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a phenyl group, a benzyl group, an allyl group, a hydroxyalkyl group having 2 to 8 carbon atoms, a glycidyl group or a dicyclopentinyl group.

(2) Vinyl aromatic compounds represented by the following general formula:

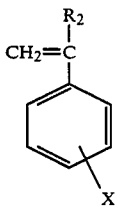

wherein $R_2$ stands for a hydrogen atom or a methyl group, and X stands for a hydrogen atom, a methyl group, a halogen atom, a nitro group, an amino group, a dimethylamino group, a diethylamino group or a tert-butyl-percarboxyl group.

(3) Other monomers such as vinyl acetate, vinyl chloride, vinylidene chloride, ethylene, butadiene, acrylonitrile and carboxylic acid vinyl esters.

Homopolymers of these monomers or copolymers of two or more of these monomers are advantageously used.

As the polymerizable monomer for formation of a hydrophilic polymer by polymerization in the presence of the relatively oleophilic polymer, there can be mentioned, for example, ethylene oxide, propylene oxide, vinylmethyl ether, $\alpha,\beta$-ethylenically unsaturated carboxylic acids such as acrylic acid, methacrylic acid, crotonic acid, itaconic acid, maleic acid, maleic anhydride, fumaric acid and maleic acid monoesters, styrenesulfonic acid, its salts, acrylic acid and methacrylic acid esters of polyalkylene glycols, acrylamide, methacrylamide, vinylpyridine and N-vinyl-2-pyrrolidone.

Polymerizable monomers providing polymers which are partially or completely rendered hydrophilic by a post treatment such as hydrolysis, such as vinyl acetate and methacrylic acid esters, are included in the foregoing monomer to be polymerized in the presence of the relatively oleophilic polymer. Incidentally, a hydrophobic monomer copolymerizable with the above-mentioned polymerizable monomer may be used in combination with the above-mentioned polymerizable monomer, so far as the polymer portion (A) of the dispersion stabilizer of the present invention does not lose the hydrophilic characteristic.

By using at least one of the polymerizable monomers providing hydrophilic polymers singly or in combination with one or more of other polymerizable monomers and carrying out the polymerization according to the above-mentioned process, a graft polymer and/or block polymer to be used as the dispersion stabilizer in the present invention can be obtained.

The so-prepared graft polymer or block polymer may be neutralized or treated with an alkali metal hydroxide, an amine or ammonia to water-solublize the hydrophilic polymer chain portion according to need. When the obtained hydrophilic polymer is dispersed in water, it sometimes happens that the polymer is not completely dissolved in water but provides a slightly opaque liquid. The reason is that although the hydrophilic polymer chain portion is dissolved in water, the oleophilic polymer chain portion is not dissolved in water but dispersed in water and a slight amount of the unreacted water-insoluble polymer is present. However, since such hardly water-soluble portion or molecule is dissolved in the monomer to be polymerized and is included in the emulsion particles, the stability of the resulting emulsion is not influenced by such hardly water-soluble portion or molecule.

In order to obtain the aqueous dispersion of the present invention, a mixture comprising a cellulose derivative and a radical-polymerizable unsaturated monomer capable of dissolving the cellulose derivative therein is emulsion-polymerized in the presence of the so-prepared dispersion stabilizer. Known processes may be used for this emulsion polymerization, and known radical initiators and chain transfer agents may be used. Furthermore, a film-forming assistant such as a solvent or a plasticizer may be added to the emulsion polymerization system in addition to the cellulose derivative and the radical-polymerizable unsaturated monomer.

The emulsion of the present invention can be widely used in the fields of general-purpose paints, adhesives, resin-processing additives and the like. Furthermore, film-forming assistants, organic solvents, plasticizers, dyes, pigments, defoaming agents, rust-preventing agents, mildew-proofing agents, water-soluble resins and crosslinking agents such as melamine may be added to the emulsion composition of the present invention in known amounts according to need. Moreover, the emulsion of the present invention may be mixed with other emulsions according to need.

An additional embodiment of the invention will be illustrated below. It is further found that a composition having advantages of both water-soluble type coating composition and emulsion type coating composition, i.e. a high solid concentration and a suitable viscosity which forms a coating film having excellent gloss, smoothness, adhesion and water resistance can be obtained by dispersing and polymerizing a radical-polymerizable unsaturated monomer in water in the presence of a high-molecular dispersion stabilizer and then crosslinking the thus obtained emulsion with a hydrophilic epoxy compound so as to remove low-molecular components from the coating film-forming resin. The above problems have been solved by the present invention.

More particularly, the inventors have found that a coating film having excellent water resistance, adhesion and gloss can be formed from an aqueous coating composition comprising:

(A) a hydrophilic epoxy compound having at least 2 epoxy groups in the molecule, and (B) an emulsion having a functional group reactive with the epoxy groups of (A) which is obtained by polymerizing at least one radical-polymerizable unsaturated monomer (I) in the presence of a high-molecular dispersion stabilizer containing a relatively oleophilic polymer moiety highly compatible with the polymer obtained from the radical-polymerizable unsaturated monomer and a hydrophilic polymer moiety in water. The present invention has been completed on the basis of this finding.

Particles of emulsion (B) of the present invention comprise an inside moiety which is a polymer having a quite high molecular weight and a high-molecular dispersion stabilizer moiety having a molecular weight lower than that of the inside polymer and surrounding the inside moiety so as to prevent the particles from the aggregation. The high-molecular dispersion stabilizer contains a relatively oleophilic polymer moiety highly compatible with the polymer constituting the inside moiety of the emulsion particle. Therefore, molecules of the stabilizer and the polymer are entangled with each other and thereby the stabilizer is firmly fixed in the particle to form the highly stable emulsion. If a coating film is formed from only emulsion (B), the resulting film looks like a floor covered with tiles. Namely, the tiles comprise the high-molecular polymer in the emulsion particles and the binders comprise the high-molecular dispersion stabilizer comprising the surfaces of the emulsion particles. The high-molecular dispersion stabilizer has numerous hydrophilic groups and a relatively low molecular weight and, therefore, it has a high compatibility with water. Thus, such a stabilizer is a most serious factor in deteriorating physical properties such as water resistance of the coating film.

According to the present invention, the high-molecular dispersion stabilizer is crosslinked with the hydrophilic epoxy compound which reacts at a relatively low temperature. Therefore, the molecular weight of the stabilizer is increased and its compatibility with water is reduced. Consequently, the composition of the present invention forms a coating film having an excellent water resistance and preferred properties.

As hydrophilic compound (A) having at least two epoxy groups in the molecule, there may be used such a polyepoxy compound that if 1 g of the compound is dissolved in 10 g of water, at least 50% of the compound is dissolved in water and it is substantially dispersed in water. Compounds (A) include, for example, ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether, sorbitol polyglycidyl ether as well as o-cresol novolak type epoxy resin which is in the form of an aqueous dispersion. However, compounds (A) are not limited to those listed above.

Radical-polymerizable unsaturated monomers (I) used for the preparation of emulsion (B) according to the present invention are unsaturated monomers radical-polymerizable into polymers in a usual manner. As monomers (I), the following compounds may be mentioned:

(1) Acrylic or methacrylic acid derivatives of the general formula:

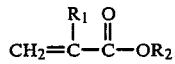

wherein $R_1$ represents hydrogen or methyl, and $R_2$ represents an alkyl group of 1–20 carbon atoms, a cycloalkyl group of 5 or 6 carbon atoms, methoxybutyl group, ethoxybutyl group, a polyalkyleneglycol residue, phenyl group, benzyl group, a hydroxyalkyl group of 2–8 carbon atoms, glycidyl group, dicyclopentyl group, $-NH_2$, $-NHCH_2OH$ or $-NHCH_2OC_4H_9$, (2) Vinyl aromatic compounds of the general formula:

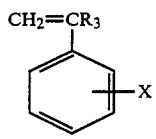

wherein $R_3$ represents hydrogen or methyl, and X represents hydrogen, methyl, ethyl, a halogen, $-NO_2$, $-NH_2$, $-N(CH_3)_2$, $-N(C_2H_5)_2$, $-SO_3H$, $-SO_3Na$, $-SO_3NH_4$, $-CH_2Cl$ or $-OH$, (3) $\alpha,\beta$-Ethylenically unsaturated carboxylic acids and salts thereof such as acrylic acid, methacrylic acid, itaconic acid, maleic acid, crotonic acid, maleic anhydride, fumaric acid, maleic acid monoesters and salts of them, and (4) Others such as vinyl acetate, N-vinyl-2-pyrrolidone, vinyl chloride, ethylene, butadiene, acrylonitrile, carboxylic acid vinyl ester and divinylbenzene.

At least one of those radical-polymerizable unsaturated monomers may be used.

The high-molecular dispersion stabilizer used for the preparation of emulsion (B) is a graft polymer or block polymer having a functional group reactive with the epoxy group (A) which stabilizer comprises:

(1) a relatively oleophilic polymer moiety highly compatible with the polymer obtained from said radical-polymerizable unsaturated monomer (I), and (2) a hydrophilic polymer moiety.

The functional groups reactive with epoxy group of (A) include, for example, carboxyl, acid anhydride, carboxylic acid salt, alcoholic hydroxyl, phenolic hydroxyl, N-methylol, primary amino, secondary amino, tertiary amino, amido, sulfonic acid, mercaptan and urethane.

As will be stated below in detail, those functional groups are present in many cases in hydrophilic polymer moiety (2) of the high-molecular dispersion stabilizer of the present invention. If the functional group is not present, it may be introduced in the high-molecular dispersion stabilizer by copolymerizing monomer (I) with a functional group-containing polymerizable monomer in the step of synthesizing the high-molecular dispersion stabilizer or by adding acrylic acid or maleic anhydride to the polymer with a radical-forming compound such as benzoyl peroxide to introduce the same.

The thus prepared high-molecular dispersion stabilizer may be neutralized, if necessary, with an alkali metal hydroxide, an amine, ammonia or a carboxylic acid to make the hydrophilic polymer moiety water-soluble.

Emulsion (B) of the present invention is obtained by dispersing radical-polymerizable unsaturated monomer (I) in water in the presence of the above high-molecular dispersion stabilizer to effect the emulsion polymerization. The emulsion polymerization may be carried out by a general, well-known method. As the radical polymerization initiator and chain transfer agent, those known in the art may be used. If necessary, usual additives used in the emulsion polymerization such as a solvent used as a film-forming assistant and a plasticizer may also be used. The thus obtained emulsion (B) may be incorporated with, if necessary, a film-forming assistant, plasticizer, dye, pigment, antifoaming agent, rust inhibitor and mold-proofing agent.

Epoxy compound (A) is mixed with emulsion (B) in a mixing ratio according to the following formula of 0.05–2.5, preferably 0.2–1.2:

$$\text{Mixing ratio} = \frac{[\text{Equivalents of epoxy groups in epoxy compound (A)}]}{\begin{bmatrix}\text{Equivalents of functional groups in emulsion}\\ \text{composition (B) reactive with epoxy groups}\\ \text{in epoxy compound (A)}\end{bmatrix}}$$

If the mixing ratio is less than 0.05, the crosslinking effect of epoxy compound (A) is poor and if the ratio is higher than 2.5, epoxy compound (A) not reacted yet is present in the coating film for a relatively long time, thereby seriously deteriorating water resistance of the coating film and further reducing hardness of the film.

The aqueous coating composition of the present invention obtained as above can be applied to an object by an ordinary coating method. The coating film is hardened at ambient temperature or by heating to a relatively low temperature.

The aqueous coating composition of the present invention has the following industrial advantages:

a. since the composition is aqueous, it is advantageous from the viewpoints of resource-saving, prevention of environmental pollution, fire prevention, and safety and hygiene of workmen,
b. since the composition is hardened at ambient temperature, it is advantageous from the viewpoints of saving energy and resources,
c. since the composition is hardened at ambient temperature, it does not necessitate an energy source (device) such as a heat source or radiation industrially advantageously,
d. the hardening velocity can remarkably be increased to improve the operation efficiency by heating with a simple heat source, and
e. the aqueous coating composition obtained by the present invention has excellent water resistance, solvent resistance, chemical resistance, weather resistance, adhesion and economic advantages and suitable for use as paints, particularly paint for metals or paint for an object which cannot be dried by heating to a high temperature.

The present invention will now be described in detail with reference to the following Examples.

EXAMPLE 1

(1) A reaction vessel equipped with a stirrer, a reflux cooler and a dropping funnel was charged with 45.1 parts (by weight; all of "parts" given hereinafter being by weight) of ethylene glycol monobutyl ether, and the ether was heated at 120° C. Then, a mixture of 25.7 parts of methyl methacrylate, 11.0 parts of 2-ethylhexyl acrylate, 9.8 parts of acrylic acid and 2.9 parts of $\alpha,\alpha'$-azobis(isobutyronitrile) was added dropwise over a period of 2 hours. After passage of 1 hour from completion of the dropwise addition, a mixture of 0.5 part of $\alpha,\alpha'$-azobis(isobutyronitrile) and 5.0 parts of ethylene glycol monobutyl ether was added, and polymerization was conducted at 120° C. for 7 hours to obtain a water-soluble polymer solution having a solid content of 49.3%

(2) Separately, a different reaction vessel equipped with a stirrer, a reflux cooler and a dropping funnel was charged with 42.2 parts of ethylene glycol monobutyl ether and the ether was heated at 70° C. Then, a mixture of 33.3 parts of methyl methacrylate, 14.3 parts of 2-ethylhexyl methacrylate, 1.8 parts of glycidyl methacrylate, 0.5 part of n-dodecylmercaptan and 2.7 parts of $\alpha,\alpha'$-azobis(isobutyronitrile) was added over a period of 2 hours. After passage of 1 hour from completion of the dropwise addition, a mixture of 0.4 part of $\alpha,\alpha'$-azobis(isobutyronitrile) and 4.7 parts of ethylene glycol monobutyl ether was added and polymerization was conducted at 70° C. for 7 hours to obtain an epoxy group-containing polymer solution having a solid content of 52.1%.

(3) Then, 84.1 parts of the water-soluble polymer solution obtained in (1) above was mixed with 15.9 parts of the epoxy group-containing polymer solution obtained in (2) above, and the mixture was heated at 130° C. and reaction was conducted for 4 hours to obtain a solution of a water-soluble polymer having branches formed by reaction and bonding of the epoxy and carboxyl groups, which had a solid content of 49.4%.

Then, 21.8 parts of the solution of the water-soluble polymer having branches formed by reaction and bonding of the epoxy and carboxyl groups, which was prepared in (3) above, 1.4 parts of 25% aqueous ammonia, 45.0 parts of water, 8.1 parts of 30% aqueous nitrocellulose (SS ¼ supplied by Daicel Kogyo K. K.), 15.6 parts of methyl acrylate and 6.7 parts of 2-ethylhexyl acrylate were sufficiently stirred to form a dispersion. An aqueous solution of 0.1 part of potassium persulfate in 1.3 parts of water was added to the obtained aqueous dispersion and polymerization was carried out at 70° C. for 3 hours. The properties of the so-obtained cellulose derivative-containing emulsion composition and the properties of the coating prepared from this emulsion composition are shown in Table 1.

Incidentally, coating of the emulsion composition was performed on a glass sheet by a 4-mil applicator. In the subsequent Examples and Comparative Examples, coating was conducted in the same manner.

EXAMPLE 2

A cellulose derivative-containing emulsion composition was prepared in the same manner as described in Example 1 except that 5.7 parts of cellulose acetate butyrate (CAB-381 0.1 supplied by Eastman Chemical Co.) and 2.4 parts of water were used instead of aqueous nitrocellulose used in Example 1. The properties of the so-obtained emulsion composition and the properties of the coating prepared from this emulsion composition are shown in Table 1.

EXAMPLE 3

(1) A reaction vessel equipped with a stirrer, a reflux cooler and a dropping funnel was charged with 46.1 parts of ethylene glycol monobutyl ether, and the ether was heated at 70° C. and a mixture of 47.4 parts of n-butyl methacrylate, 1.5 parts of glycidyl methacrylate, 2.2 parts of $\alpha,\alpha'$-azobis(isobutyronitrile) and 0.7 part of n-dodecylmercaptan was added dropwise over a period of 2 hours. After passage of 1 hour from completion of the dropwise addition, a mixture of 0.4 part of $\alpha,\alpha'$-azobis(isobutyronitrile) and 1.7 parts of ethylene glycol monobutyl ether was added, and polymerization was carried out at 70° C. for 7 hours to obtain an epoxy group-containing polymer solution having a solid content of 50.6%.

(2) Then, 83.7 parts of the water-soluble polymer solution obtained in (1) of Example 1 was mixed with 16.3 parts of the epoxy group-containing polymer solution prepared in (1) above, and reaction was carried out at 130° C. for 4 hours to obtain a solution of a water-soluble polymer having branches formed by reaction and bonding of the epoxy and carboxyl groups, which has a solid content of 49.5%.

To 21.8 parts of the polymer solution obtained in (2) above, which had branches formed by bonding of epoxy and carboxyl groups, were added 45.1 parts of water, 1.4 parts of 25% aqueous ammonia, 8.1 parts of 30% aqueous nitrocellulose (SS ¼ supplied by Daicel Kagaku Kogyo K. K.), 15.6 parts of methyl methacrylate and 6.7 parts of 2-ethylhexyl acrylate, and the mixture was sufficiently stirred to form a dispersion. An aqueous solution of 0.1 part of potassium persulfate in 1.3 parts of water was added to the dispersion, and polymerization was carried out at 80° C. for 3 hours. The properties of the so-obtained cellulose derivative-containing emulsion composition and the properties of the coating prepared from the emulsion composition are shown in Table 1.

EXAMPLE 4

(1) In a reaction vessel equipped with a stirrer, a reflux cooler and a dropping funnel, 45.1 parts of toluene was heated at 100° C. in a nitrogen atmosphere, and a mixture of 25.7 parts of methyl methacrylate, 11.0 parts of 2-ethylhexyl acrylate, 9.8 parts of acrylic acid and 2.9 parts of $\alpha,\alpha'$-azobis(isobutyronitrile) was added dropwise over a period of 2 hours. After passage of 1 hour from completion of the dropwise addition, a mixture of 0.5 part of $\alpha,\alpha'$-azobis(isobutyronitrile) and 5.0 parts of toluene was further added, and polymerization was then carried out at 100° C. for 7 hours to obtain a water-soluble polymer solution having a solid content of 49.3%.

(2) Separately, a different reaction vessel equipped with a stirrer, a reflux cooler and a dropping funnel was charged with 42.4 parts of toluene, and the charged toluene was heated at 100° C. and a mixture of 33.3 parts of methyl methacrylate, 14.3 parts of 2-ethylhexyl acrylate, 1.7 parts of 2-hydroxyethyl acrylate, 0.5 part of n-dodecylmercaptan and 2.7 parts of $\alpha,\alpha'$-azobis(isobutyronitrile was added dropwise over a period of 2 hours. After passage of 1 hour from completion of the dropwise addition, a mixture of 0.4 part of $\alpha,\alpha'$-azobis(isobutyronitrile) and 4.7 parts of toluene was further added and polymerization was carried out at 100° C. for 7 hours to obtain a hydroxyl group-containing polymer solution having a solid content of 52.1%.

(3) A mixture of 84.1 parts of the water-soluble polymer solution obtained in (1) above, 15.9 parts of the hydroxyl group-containing polymer solution obtained in (2) above and 0.01 part of p-toluene-sulfonic acid was refluxed for 20 hours whil removing water formed by reaction. Then, toluene was removed by distillation, and when about ½ of toluene was removed, 50.0 parts of ethylene glycol monobutyl ether was added and distillation under reduced pressure was carried out to remove the remainder of toluene and a part of ethylene glycol monobutyl ether, whereby a solution of a water-soluble graft polymer having ester bonds fromed by reaction between the carboxyl and hydroxyl groups, which had a solid content of 55.4%, was obtained.

(4) To 20.0 parts of the water-soluble graft polymer solution, which was obtained in (3) above, were added 45.4 parts of water, 1.8 parts of 25% aqueous ammonia, 8.3 parts of 30% aqueous nitrocellulose (SS ¼ supplied by Daicel Kagaku Kogyo K. K.), 16.1 parts of methyl methacrylate and 6.9 parts of 2-ethylhexyl acrylate and the mixture was sufficiently stirred to form a dispersion. An aqueous solution of 0.1 part of potassium persulfate in 1.4 parts of water was added to the dispersion, and polymerization was carried out at 80° C. for 3 hours. The properties of the so-obtained cellulose derivative-containing emulsion composition and the properties of the coating prepared from this emulsion composition are shown in Table 1.

EXAMPLE 5

A cellulose derivative-containing emulsion composition was prepared in the same manner as described in Example 4 except that 5.7 parts of cellulose acetate butyrate (CAB-381 0.1 supplied by Eastman Chemical Co.) was used instead of the aqueous nitrocellulose used in Example 4 and 2.5 parts of water was further added. The properties of the emulsion composition and the properties of the coating prepared from the emulsion are shown in Table 1.

EXAMPLE 6

(1) A reaction vessel equipped with a stirrer, a reflux cooler and a dropping funnel was charged with 50.2 parts of ethylene glycol methyl ether acetate and the acetate was heated at 120° C., and a mixture of 24.9 parts of methyl methacrylate, 10.7 parts of 2-ethylhexyl acrylate, 9.7 parts of acrylic acid, 1.1 parts of 2-hydroxyethyl methacrylate and 2.9 parts of $\alpha,\alpha'$-azobis(isobutyronitrile) was added dropwise over a period of 2 hours. After passage of 1 hour from completion of the dropwise addition, 0.5 part of $\alpha,\alpha'$-azobis(isobutyronitrile) was added and polymerization was carried out at 120° C. for 6 hours to obtain a hydroxyl group-containing polymer solution having a solid content of 49.3%.

(2) Separately, a different reaction vessel equipped with a stirrer, a reflux cooler and a dropping funnel was charged with 50.3 parts of ethylene glycol methyl ether acetate, and the charged acetate was heated at 80° C. and a mixture of 44.7 parts of n-butyl methacrylate and 4.5 parts of 4,4'-azobis 4-cyanopentanoic acid chloride was added dropwise over a period of 3 hours. After passage of 1 hour from completion of the dropwise addition, 0.5 part of 4,4'-azobis 4-cyanopentanoic acid chloride was further added and polymerization was carried out at 80° C. for 6 hours to form a solution of an acid chloride-terminated polymer having a solid content of 49.1%.

(3) Then, 83.3 parts of the water-soluble polymer solution obtained in (1) above was mixed with 16.7 parts of the terminal acid chloride group-containing polymer solution obtained in (2) above, and the mixture was heated at 100° C. and reaction was carried out for 10 hours. Then, a part of ethylene glycol methyl ether acetate was removed by distillation under pressure to obtain a solution of a water-soluble graft polymer formed by ester exchange reaction, which had a solid content of 72.1%.

(4) To 15.4 parts of the water-soluble graft polymer solution obtained (3) above was added 50.0 parts of water, 1.7 parts of 25% aqueous ammonia, 16.1 parts of methyl methacrylate, 7.0 parts of 2-ethylhexyl acrylate and 8.3 parts of 30% aqueous nitrocellulose (SS ¼ supplied by Daicel Kagaku Kogyo K. K.), and the mixture was sufficiently stirred to form an aqueous dispersion. An aqueous solution of 0.1 part of potassium persulfate in 1.4 parts of water was added to the aqueous dispersion and polymerization was carried out at 80° C. for 3 hours. The properties of the so-obtained emulsion and the properties of the coating from this emulsion are shown in Table 1.

EXAMPLE 7

(1) In a reaction vessel equipped with a stirrer, a reflux cooler and a dropping funnel, 45.1 parts of toluene was heated at 100° C., and a mixture of 25.7 parts of methyl methacrylate, 11.0 parts of 2-ethylhexyl acrylate, 9.8 parts of acrylic acid and 2.9 parts of $\alpha,\alpha'$-azobis(isobutyronitrile) was added dropwise over a period of 2 hours. After passage of 1 hour from completion of the dropwise addition, a mixture of 0.5 part of $\alpha,\alpha'$-azobis(isobutyronitrile) and 5.0 parts of toluene was further added and polymerization was carried out at 100° C. for 7 hours to obtain a water-soluble polymer solution having a solid content of 49.3%.

(2) In a different reaction vessel equipped with a stirrer, a reflux cooler and a dropping funnel, 57.2 parts of tolylene diisocyanate was heated at 50° C., and a solution of 0.1 part of hydroquinone in 42.7 parts of 2-hydroxyethyl methacrylate was added dropwise over a period of 4 hours. Then, reaction was conducted at 50° C. for 3 hours and the reaction mixture was allowed to stand for one day to obtain a white waxy isocyanate-modified acrylic monomer.

The inner temperature of a reaction vessel equipped with a stirrer, a reflux cooler and a dropping funnel and charged with 48.2 parts of toluene was maintained at 100° C., and a mixture of 3.7 parts of the so-formed isocyanate-modified acrylic monomer, 31.6 parts of methyl methacrylate, 13.5 parts of 2-ethylhexyl acrylate and 2.6 parts of $\alpha,\alpha'$-azobis(isobutyronitrile) was added dropwise over a period of 2 hours. After passage of 1 hour from completion of the dropwise addition, 0.4 part of $\alpha,\alpha'$-azobis(isobutyronitrile) was further added and polymerization was carried out at 100° C. for 7 hours to obtain an isocyanate group-containing polymer solution having a solid content of 51.0%.

(3) Then, 54.0 parts of the water-soluble polymer solution obtained in (1) above was mixed with 10.4 parts of the isocyanate group-containing polymer solution obtained in (2) above, and the mixture was heated at 100° C. and reaction was carried out at 100° C. under agitation for 3 hours. Then, a part of toluene was removed by distillation, and 35.6 parts of ethylene glycol monobutyl ether was added, and the remainder of toluene and a part of ethylene glycol monobutyl ether were removed by distillation to obtain a solution of a graft polymer obtained by intermolecular reaction, which had a solid content of 78.4%.

(4) To 14.8 parts of the water-soluble graft polymer solution obtained in (3) above was added 49.1 parts of water, 1.9 parts of 25% aqueous ammonia, 16.8 parts of methyl methacrylate, 7.2 parts of 2-ethylhexyl acrylate and 8.7 parts of 30% aqueous nitrocellulose (SS ¼ supplied by Daicel Kagaku Kogyo K. K.), and the mixture was sufficiently stirred to form an aqueous dispersion. An aqueous solution of 0.1 part of potassium persulfate in 1.4 parts of water was added to the aqueous dispersion and polymerization was carried out at 80° C. for 3 hours. The properties of the so-obtained emulsion and the properties of the coating from this emulsion are shown in Table 1.

EXAMPLE 8

(1) In a reaction vessel equipped with a stirrer, a reflux cooler and a dropping funnel, 43.7 parts of toluene was heated at 100° C., and a mixture of 34.4 parts of methyl methacrylate, 14.7 parts of 2-ethylhexyl acrylate, 1.7 parts of 2-hydroxyethyl acrylate and 2.8 parts of $\alpha,\alpha'$-azobis(isobutyronitrile) was added dropwise over a period of 2 hours. After passage of 1 hour from completion of the dropwise addition, 0.4 part of $\alpha,\alpha'$-azobis(isobutyronitrile) was further added and polymerization was carried out at 100° C. for 7 hours. Then, the temperature was lowered to 80° C. by cooling.

Then, 2.3 parts of tolylene diisocyanate was added to the reaction mixture with sufficient stirring and reaction was carried out at 80° C. for 5 hours to obtain an isocyanate group-containing polymer solution having a solid content of 55.2%.

(2) Then, 54.5 parts of the water-soluble polymer solution obtained in (1) of Example 1 was mixed with 9.7 parts of the isocyanate group-containing polymer solution obtained in (1) above, and the mixture was heated at 100° C. and reaction was carried out at 100° C. under agitation for 3 hours. Then, a part of toluene was removed by distillation, and 35.8 parts of ethylene glycol monobutyl ether was added, and the remainder of toluene and a part of ethylene glycol monobutyl ether were removed by distillation to obtain a solution of a graft polymer obtained by intermolecular reaction, which had a solid content of 71.3%.

(3) A reaction vessel equipped with a stirrer, a reflux cooler and a dropping funnel was charged with 15.5 parts of the water-soluble graft polymer solution obtained in (2) above, 49.9 parts of water, 1.8 parts of 25% aqeuous ammonia, 23.0 parts of n-butyl methacrylate and 8.3 parts of 30% aqueous nitrocellulose (SS ¼ supplied by Daicel Kagaku Kogyo K. K.), and the mixture was sufficiently stirred to form an aqueous dispersion. An aqueous solution of 0.1 part of potassium persulfate in 1.4 parts of water was added to the aqueous dispersion and polymerization was carried out at 80° C. for 3 hours. The properties of the so-obtained emulsion and the properties of the coating from this emulsion are shown in Table 1.

EXAMPLE 9

(1) In a reaction vessel equipped with a stirrer, a reflux cooler and a dropping funnel, 48.4 parts of toluene was heated at 100° C., and a mixture of 6.7 parts of ethyl acrylate, 15.1 parts of methyl methacrylate, 9.4 parts of acrylic acid, 17.2 parts of 2-ethylhexyl methacrylate and 2.8 parts of $\alpha,\alpha'$-azobis(isobutyronitrile) was added dropwise over a period of 2 hours. After passage of 1 hour from completion of the dropwise addition, 0.4 part of $\alpha,\alpha'$-azobis(isobutyronitrile) was further added and polymerization was carried out at 100° C. for 7 hours to obtain a water-soluble polymer solution having a solid content of 51.6%.

(2) In a different reaction vessel equipped with a stirrer, a reflux cooler and a dropping funnel, 46.0 parts of toluene was heated at 100° C., and a mixture of 4.1 parts of 4,4'-azobis(4-cyanopentanoic acid) and 47.2 parts of n-butyl methacrylate was added dropwise over a period of 4 hours. Then, 0.4 part of $\alpha,\alpha'$-azobis-(isobutyronitrile) was further added and polymerization was carried out at 100° C. for 3 hours. Then, the temperature was lowered to 80° C. by cooling.

Then, 2.3 parts of tolylene diisocyanate was added to the reaction mixture with sufficient stirring and reaction was carried out at 80° C. for 5 hours to obtain an isocyanate group-containing polymer solution having a solid content of 53.5%.

(3) Then, 53.2 parts of the water-soluble polymer solution obtained in (1) above was mixed with 10.3 parts of the isocyanate group-containing polymer solution obtained in (2) above, and the mixture was heated at 100° C. and reaction was carried out at 100° C. under agitation for 3 hours. Then, a part of toluene was removed by distillation, and 36.5 parts of ethylene glycol monobutyl ether was added, and the remainder of toluene and a part of ethylene glycol monobutyl ether were removed by distillation to obtain a solution of a graft polymer obtained by intermolecular reaction, which had a solid content of 78.3%.

(4) To 14.5 parts of the graft polymer solution obtained in (3) above was added 52.6 parts of water, 1.8 parts of 25% aqueous ammonia, 23.6 parts of n-butyl methacrylate and 6.0 parts of cellulose acetate butyrate (CAB-381 0.1 supplied by Eastman Chemical Co.), and the mixture was sufficiently stirred to form an aqueous dispersion. An aqueous solution of 0.1 part of potassium persulfate in 1.4 parts of water was added to the aqueous dispersion and polymerization was carried out at 80° C. for 3 hours. The properties of the so-obtained emulsion and the properties of the coating from this emulsion are shown in Table 1.

COMPARATIVE EXAMPLE 1

A reaction vessel equipped with a stirrer, a reflux cooler and a dropping funnel was charged with 9.3 parts of 30% aqueous nitrocellulose (SS ¼ supplied by Daicel Kagaku Kogyo K.K.), 22.5 parts of methyl methacrylate, 12.2 parts of 2-ethylhexyl acrylate, 0.3 part of methacrylic acid, 51.4 parts of water, 1.3 parts of sodium dodecyl benzene-sulfonate and 1.3 parts of Gafac RE-610 (anionic composite phosphate ester emulsifier supplied by Toho Kagaku Kogyo K.K.), and the mixture was sufficiently stirred to form a dispersion. Then, an aqueous solution of 0.1 part of potassium persulfate in 1.6 parts of water was added to the dispersion heated at 80° C., and polymerization was carried out for 3 hours to obtain a cellulose derivative-containing emulsion composition. The properties of the emulsion composition and the properties of the coating prepared from this emulsion composition are shown in Table 1.

COMPARATIVE EXAMPLE 2

In a reaction vessel equipped with a stirrer, a reflux cooler and dropping funnel, 45.1 parts of ethylene glycol monobutyl ether was heated at 120° C., and a mixture of 25.7 parts of methyl methacrylate. 11.0 parts of 2-ethylhexyl acrylate, 9.8 parts of acrylic acid and 2.9 parts of $\alpha,\alpha'$-azobisisobutyronitrile was added dropwise over a period of 2 hours. After passage of 1 hour from completion of the dropwise addition, a mixture of 0.5 part of $\alpha,\alpha'$-azobisisobutyronitrile and 5.0 parts of ethylene glycol monobutyl ether was added, and polymerization was carried out for 7 hours to obtain a water-soluble polymer solution having a solid content of 49.3%.

To 21.8 parts of the so-obtained water-soluble polymer solution were added 44.9 parts of water, 1.6 parts of 25% aqueous ammonia, 8.0 parts of 30% aqueous nitrocellulose (SS ¼ supplied by Daicel Kagaku Kogyo K.K.), 1.56 parts of methyl methacrylate and 6.7 parts of 2-ethylhexyl acrylate, and the mixture was stirred to form a dispersion. Then, an aqueous solution of 0.1 part of sodium persulfate in 1.3 parts of water was added to the dispersion, and polymerization was carried out at 80° C. During the polymerization, the polymer was separated from water, and further continuation of the polymerization was difficult.

COMPARATIVE EXAMPLE 3

A part of ethylene glycol monobutyl ether was removed from the water-soluble polymer solution obtained in Comparative Example 2 by distillation under reduced pressure to obtain a water-soluble polymer solution having a solid content of 86.3%.

To 12.4 parts of the above water-soluble polymer solution were added 54.3 parts of water, 1.6 parts of 25% aqueous ammonia, 8.0 parts of 30% aqueous nitrocellulose (SS ¼ supplied by Daicel Kagaku Kogyo K.K.), 15.6 parts of methyl methacrylate and 6.7 parts of 2-ethylhexyl acrylate. The mixture was sufficiently stirred to form a dispersion. An aqueous solution of 0.1 part of potassium persulfate in 1.3 parts of water was added to the dispersion and polymerization was carried out at 80° C. for 3 hours. The properties of the so-obtained cellulose derivative-containing emulsion composition and the coating prepared from this emulsion composition are shown in Table 1.

TABLE 1

| Test Items | Example 1 | Example 2 | Example 3 | Example 4 | Example 5 | Example 6 | Example 7 | Example 8 | Example 9 | Comparative Example 1 | Comparative Example 3 |
|---|---|---|---|---|---|---|---|---|---|---|---|
| Properties of Emulsion | | | | | | | | | | | |
| solid content (%) | 38.2 | 38.6 | 38.3 | 39.5 | 39.1 | 39.4 | 40.5 | 39.1 | 40.1 | 43.8 | 38.5 |
| viscosity (cps) | 60 | 130 | 100 | 110 | 80 | 60 | 90 | 80 | 120 | 20 | 70 |
| standing stability | | | | | | | | | | | |
| (room temperature, 1 month) | no change | no change | no change | no change | no change | no change | no change | no change | no change | no change | no change |
| (50° C., 7 days) | no change | no change | no change | no change | no change | no change | no change | no change | no change | no change | no change |
| stability to addition of water-soluble organic solvent | | | | | | | | | | | |
| 1 isopropyl alcohol | | | | | | | | | | | |
| (10% solvent/emulsion) | ⊚ | ⊚ | ⊚ | ⊚ | ⊚ | ⊚ | ⊚ | ⊚ | ⊚ | X | △ |
| (50% solvent/emulsion) | ⊚ | ⊚ | ○ | ⊚ | ⊚ | ⊚ | ⊚ | ⊚ | ○ | X | X |
| 2 ethylene glycol n-butyl ether | | | | | | | | | | | |
| (10% solvent/emulsion) | ⊚ | ⊚ | ⊚ | ⊚ | ⊚ | ○ | ⊚ | ⊚ | ⊚ | X | △ |
| 3 ethylene glycol methyl ether acetate | | | | | | | | | | | |
| (10% solvent/emulsion) | ⊚ | ⊚ | ⊚ | ⊚ | ⊚ | ⊚ | ⊚ | ⊚ | ○ | X | △ |
| Properties of Coating | | | | | | | | | | | |
| transparency | ⊚ | ○ | ⊚ | ⊚ | ○ | ⊚ | ⊚ | ⊚ | △ | ⊚ | ⊚ |
| gloss | 85 | 76 | 85 | 85 | 76 | 85 | 85 | 83 | 72 | 85 | 83 |
| hardness | H | F | HB | HB | F | H | HB | H | H | HB | F |
| non-tackiness | ⊚ | ○ | ⊚ | ⊚ | ⊚ | ○ | ⊚ | ⊚ | ⊚ | ⊚ | ⊚ |
| water resistance | ○ | ⊚ | ○ | ○ | ○ | ⊚ | ⊚ | ⊚ | ⊚ | △ | ○ |
| adhesion | ⊚ | ⊚ | ⊚ | ○ | ⊚ | ○ | ○ | ⊚ | ○ | △ | ⊚ |
| gasoline resistance | ⊚ | ⊚ | ⊚ | ⊚ | ○ | ○ | ⊚ | ○ | ⊚ | ⊚ | ○ |
| polishing property | ○ | ○ | ○ | ⊚ | ○ | ○ | ⊚ | ⊚ | ○ | ○ | ○ |

The properties of the emulsions and coatings shown in Table 1 were determined according to the following test methods.

Viscosity:

The viscosity was measured at 30° C. and 30 rpm by using a Brookfield type viscometer.

Standing stability (room temperature, 1 month):

The emulsion was allowed to stand at room temperature for 1 month, and the emulsion was thinly coated uniformly on a clean glass sheet by a glass rod and the presence or absence of agglomerates was immediately checked.

Standing stability (50° C., 7 days):

The emulsion was allowed to stand still in a thermostat chamber in an atmosphere maintained at 50° C. continuously for 7 days, and the emulsion was naturally cooled for 3 hours. The emulsion was thinly coated uniformly on a clean glass sheet by a glass rod and the presence or absence of agglomerates was immediately checked.

Stability to addition of water-soluble organic solvent (10% solvent/emulsion):

While 50 g of the emulsion was being stirred, 5 g of a water-soluble organic solvent was dropped thereto. Stirring was conducted for 1 hour. Then, the sample was thinly coated uniformly on a clean glass sheet by a glass rod and the presence or absence of agglomerates was immediately checked.

Stability to addition of water-soluble organic solvent (50% solvent/emulsion):

While 50 g of the emulsion was being stirred, 25 g of a water-soluble organic solvent was dropped thereto. Stirring was conducted for 1 hour. Then, the stability was checked in the same manner as described above with respect to the case of 10% solvent/emulsion.

Transparency:

The emulsion was coated on a glass sheet and the transparency was evaluated with the naked eye.

Gloss:

The emulsion was coated on a glass sheet and the 60° specular surface reflectance of the coating was measured.

Hardness:

The emulsion was coated on a surface-treated soft steel plate and dried at room temperature for 7 days, and the pencil hardness was measured.

Non-tackiness:

The emulsion was coated on a glass sheet and dried at room temperature for 3 days. While the glass sheet was maintained in the horizontal posture so that the coated surface was located above, 5 gauze sheets having a size of 50 mm × 50 mm were piled on the central portion of the coated surface in a thermostat chamber maintained at a temperature of 50° C. and a relative humidity of 90%. A 500 g weight having a flat bottom and a diameter of 40 mm was placed on the central portion of the piled gauze sheets. In this state, the coated glass sheet was allowed to stand for 18 hours. Then, the gauze sheets were separated from the coated surface, and the degree of adhesion to the coated surface and the trace of the gauze texture on the coated surface were examined.

Water resistance:

The emulsion was coated on a glass sheet and dried at room temperature for 3 days. Then, water was applied to the coated surface and after 3 hours, the change of the coating was examined.

Adhesion:

The emulsion was coated on a soft steel plate prepared according to JIS K-5400 and dried at room temperature for 3 days. Square cuts of 1 mm × 1 mm were formed on the coated surface (11 cut lines) and an adhesive cellophane tape was applied thereto under compression. Then, the tape was peeled, and the state of peeling of the square cuts from the steel plate was checked.

Gasoline resistance:

The emulsion was coated on a glass sheet and dried at room temperature for 3 days. Gasoline was applied to the coated surface and was naturally evaporated. Then, gasoline was dropped on the coated surface again. This operation was repeated 5 times, and the state of the coating was examined.

Polishing property:

The emulsion was coated on a soft steel plate and dried at room temperature for 3 days. Then, the coated surface was polished by #400 water-resistant grinding paper 10 times, and it was checked whether or not entanglement was caused in the polishing paper.

The evaluation results are expressed according to the 5-staged ranking of ⊚, ○, ⊕, Δ and X.

The results ⊚, ○ and ⊕ indicate that the samples are practically applicable, and the results Δ and X indicate that the samples have no practical utility.

The second embodiment of the invention will be illustrated more in detail in line with examples thereof.

EXAMPLE 10

(1) A reaction vessel equipped with a stirrer, a reflux cooler, a thermometer and a dropping funnel was charged with 719.5 parts of xylene, and charged xylene was heated at 100° C. and a mixture of 134.2 parts of methyl methacrylate, 57.5 parts of 2-ethylhexyl acrylate, 15.4 parts of thioglycolic acid and 13.6 parts of $\alpha,\alpha'$-azobis(isobutyronitrile) was added dropwise over a period of 3 hours. After passage of 1 hour from completion of the dropwise addition, a mixture of 3.0 parts of $\alpha,\alpha'$-azobis(isobutyronitrile) and 33.0 parts of xylene was further added, and polymerization was then carried out at 100° C. for 7 hours. Then, the temperature was elevated to 140° C. and a mixture of 23.5 parts of glycidyl methacrylate and 0.3 part of hydroquinone was adeed dropwise to the reaction mixture over a period of 30 minutes, and after completion of the dropwise addition, reaction was further conducted at 140° C. for 4 hours to obtain a solution of a high-molecular-weight monomer having radical-polymerizable unsaturated bonds on the molecule ends, which had a solid content of 23.7%.

(2) Separately, a different reaction vessel equipped with a stirrer, a reflux cooler, a thermometer and a dropping funnel was charged with 170.8 parts of ethylene glycol monobutyl ether, and the charged ether was heated at 100° C. and a mixture of 234.9 parts of the high-molecular-weight monomer solution obtained in (1) above, 117.5 parts of methyl methacrylate, 86.6 parts of 2-ethylhexyl acrylate, 71.4 parts of acrylic acid and 18.8 parts of $\alpha,\alpha'$-azobis(isobutyronitrile) was added dropwise over a period of 2 hours. After passage of 1 hour from completion of the dropwise addition, a mixture of 2.9 parts of $\alpha,\alpha'$-azobis(isobutyronitrile) and 29.4 parts of ethylene glycol monobutyl ether was further added and polymerization was carried out at 100° C. for 7 hours. Then, a mixture of 258.3 parts of water and 9.4 parts of 25% aqueous ammonia was added to the reaction mixture, and xylene, a part of water and a part of ethylene glycol monobutyl ether were removed by distillation to obtain a polymer solution having a solid content of 50.4%.

(3) To 210.9 parts of the polymer solution obtained in (2) above were added 458.3 parts of water, 2.1 parts of 25% aqueous ammonia, 83.4 parts of 30% aqueous nitrocellulose (SS ¼), 161.2 parts of methyl methacrylate and 69.5 parts of 2-ethylhexyl acrylate, and the mixture was sufficiently stirred to form a dispersion. An aqueous solution of 0.7 part of potassium persulfate in 13.9 parts of water was added to the dispersion, and polymerization was carried out at 80° C. for 3 hours. The properties of the so-obtained cellulose derivative-containing emulsion composition and the properties of the coating prepared from this emulsion composition are shown in Table 2.

EXAMPLE 11

A reaction vessel equipped with a stirrer, a reflux cooler, a thermometer and a dropping funnel was charged with 210.9 parts of the polymer solution obtained in (2) of Example 10, and 483.5 parts of water, 2.1 parts of 25% aqueous ammonia, 58.3 parts of cellulose acetate butyrate (CAB-381 0.1 supplied by Eastman Chemical Co.) and 230.6 parts of n-butyl methacrylate were added. The mixture was sufficiently stirred to form a dispersion, and an aqueous solution of 0.7 part of potassium persulfate in 13.9 parts of water was added to the dispersion and polymerization was carried out at 80° C. for 3 hours. The properties of the so-obtained cellulose derivative-containing emulsion composition and the properties of the coating prepared from the emulsion composition are shown in Table 2.

EXAMPLE 12

(1) A reaction vessel equipped with a stirrer, a reflux cooler, a thermometer and a dropping funnel was charged with 687.0 parts of xylene, and charged xylene was heated at 100° C. and a mixture of 220.0 parts of n-butyl methacrylate, 2.5 parts of thioglycolic acid and 29.2 parts of 4,4′-azobis(chanopentanoic acid) was added dropwise over a period of 3 hours. After passage of 1 hour from completion of the dropwise addition, a mixture of 3.1 parts of 4,4′-azobis(chanopentanoic acid) and 31.2 parts of xylene was further added, and polymerization was carried out at 100° C. for 7 hours. Then, the temperature was elevated to 140° C. and a mixture of 26.7 parts of glycidyl methacrylate and 0.3 part of hydroquinone was added dropwise to the reaction mixture over a period of 30 minutes. After completion of the dropwise addition, reaction was carried out at 140° C. for 4 hours to obtain a solution of a high-molecular-weight monomer having radical-polymerizable unsaturated bonds in the molecule ends, which had a solid content of 27.2%.

(2) Separately, a different reaction vessel equipped with a stirrer, a reflux cooler, a thermometer and a dropping funnel was charged with 327.0 parts of ethylene glycol monobutyl ether, and the charged ether was heated at 100° C. and a mixture of 98.2 parts of methyl methacrylate, 129.6 parts of 2-ethylhexyl methacrylate, 49.1 parts of ethyl acrylate, 70.6 parts of acrylic acid, 35.7 parts of dicyclopentinyl methacrylate and 20.9 parts of α,α′-azobis(isobutyronitrile) was added dropwise over a period of 2 hours. After passage of 1 hour from completion of the dropwise addition, a mixture of 3.3 parts of α,α′-azobis(isobutyronitrile) and 36.6 parts of ethylene glycol monobutyl ether was further added and polymerization was carried out at 100° C. for 7 hours.

Xylene and a part of ethylene glycol monobutyl ether were removed by distillation under reduced pressure to obtain a polymer solution having a solid content of 69.2%.

(3) To 199.3 parts of the polymer solution having a solid content of 69.2%, which was obtained in (2) above, were added 472.9 parts of water, 17.1 parts of 25% aqueous ammonia, 218.1 parts of n-butyl methacrylate and 78.8 parts of 30% aqueous nitrocellulose (SS ¼), and the mixture was sufficiently stirred to form a dispersion. An aqueous solution of 0.7 part of potassium persulfate in 13.1 parts of water was added to the dispersion, and polymerization was carried out at 80° C. for 3 hours. The properties of the so-obtained cellulose derivative-containing emulsion composition and the properties of the coating prepared from this emulsion composition are shown in Table 2.

EXAMPLE 13

(1) In a reaction vessel equipped with a stirrer, a reflux cooler, a thermometer and a dropping funnel, 6.4 parts of toluene was heated at 100° C., and a mixture of 4.7 parts of n-butyl methacrylate, 0.1 part of glycidyl methacrylate, 1.6 parts of styrene and 0.3 part of α,α′-azonisisobutyronitrile was added dropwise over a period of 3 hours in a nitrogen atmosphere.

After passage of 1 hour from completion of the dropwise addition, a mixture of 0.1 parts of α,α′-azobis-(isobutyronitrile) and 1.3 parts of toluene was further added, and polymerization was then carried out at 100° C. for 4 hours. Then, while the nitrogen atmosphere was maintained, a mixture of 38.6 parts of toluene and 0.6 part of thioglycolic acid was added to the reaction mixture. The temperature was elevated under sufficient stirring and the reaction mixture was refluxed for 36 hours.

Then, the temperature was lowered to 100° C., and a mixture of 3.6 parts of ethyl acrylate, 8.2 parts of methyl methacrylate, 8.7 parts of 2-ethylhexyl acrylate, 5.1 parts of acrylic acid and 1.5 parts of benzoyl peroxide was added dropwise to the reaction mixture over a period of 2 hours. After completion of the dropwise addition, 19.2 parts of ethylene glycol monobutyl ether was added and polymerization was carried out at 100° C. for 3 hours. Then, toluene and a part of ethylene glycol monobutyl ether were removed by distillation under reduced pressure to obtain an acrylic-styrene copolymer solution having a solid content of 68.2%.

(2) A different reaction vessel equipped with a stirrer, a reflux cooler, a thermometer and a dropping funnel was charged with 16.3 parts of the above acrylic-styrene copolymer solution, 1.5 parts of 28% aqueous ammonia, 48.0 parts of water, 8.3 parts of 30% aqueous nitrocellulose, 17.3 parts of n-butyl methacrylate and 5.8 parts of styrene, and the mixture was sufficiently stirred to form a dispersion. An aqueous solution of 0.1 part of potassium persulfate in 2.7 parts of water was added to the dispersion and polymerization was carried out at 80° C. for 3 hours. The properties of the so-obtained cellulose derivative-containing emulsion composition and the properties of the coating prepared from this emulsion composition are shown in Table 2.

EXAMPLE 14

(1) A reaction vessel equipped with a stirrer, a reflux cooler, a thermometer and a dropping funnel was charged with 40.0 parts of ethylene glycol monobutyl ether and the ether was heated at 120° C., and a mixture of 5.6 parts of ethyl acrylate, 12.6 parts of methyl methacrylate, 14.4 parts of 2-ethylhexyl methacrylate, 7.9 parts of acrylic acid and 2.3 parts of $\alpha,\alpha'$-azobis-(isobutyronitrile) was added dropwise over a period of 2 hours in a nitrogen atmosphere. After completion of the dropwise addition, polymerization was carried out at 120° C. for 1 hour. Then, a mixture of 0.4 part of $\alpha,\alpha'$-azobisisobutyronitrile and 2.1 parts of ethylene glycol monobutyl ether was added to the reaction mixture and polymerization was carried out at 120° C. for 2 hours. Then, glycidyl methacrylate was dropped over a period of 1 hour and the temperature was elevated to 140° C., and reaction was conducted for 4 hours.

Then, the temperature was lowered to 120° C. and a mixture of 10.3 parts of n-butyl methacrylate and 0.3 part of benzoyl peroxide was added dropwise to the reaction mixture over a period of 2 hours. After passage of 1 hour from completion of the dropwise addition, a mixture of 0.1 part of benzoyl peroxide and 1.8 parts of ethylene glycol monobutyl ether was added, and polymerization was carried out at 120° C. for 3 hours. Then, a part of ethylene glycol monobutyl ether was removed by distillation under reduced pressure to obtain an acrylic copolymer solution having a solid content of 75.0%.

(2) A different reaction vessel equipped with a stirrer, a reflux cooler, a thermometer and a dropping funnel was charged with 14.8 parts of the above acrylic copolymer solution, 1.5 parts of 28% aqueous ammonia, 49.5 parts of water, 8.3 parts of 30% aqueous nitrocellulose (SS ¼) and 23.0 parts of n-butyl methacrylate, and the mixture was sufficiently stirred to form a dispersion. An aqueous solution of 0.1 part of potassium persulfate in 2.8 parts of water was added to the dispersion and polymerization was carried out at 80° C. for 3 hours. The properties of the so-obtained cellulose derivative-containing emulsion composition and the properties of the coating prepared from this emulsion composition are shown in Table 2.

EXAMPLE 15

A cellulose derivative-containing emulsion composition was prepared in the same manner as described in Example 14 except that 5.8 parts of cellulose acetate butyrate (CAB-381 0.1) and 2.5 parts of water were used instead of aqueous nitrocellulose used in Example 14. The properties of the so-obtained emulsion composition and the properties of the coating prepared from this emulsion composition are shown in Table 2.

EXAMPLE 16

(1) In a reaction vessel equipped with a stirrer, a reflux cooler, a thermometer and a dropping funnel, 39.4 parts of ethylene glycol monobutyl ether was heated at 65° C., and a mixture of 5.8 parts of methyl acrylate, 13.1 parts of methyl methacrylate, 8.2 parts of acrylic acid, 15.0 parts of 2-ethylhexyl methacrylate, 0.4 part of allyl methacrylate and 2.4 parts of $\alpha,\alpha'$-azobisisobutyronitrile was added dropwise in a nitrogen atmosphere over a period of 5 hours. Polymerization was carried out at 65° C. for 1 hour, and a mixture of 0.4 part of $\alpha,\alpha'$-azobisisobutyronitrile and 2.7 parts of ethylene glycol monobutyl ether was added to the reaction mixture and polymerization was further conducted at 65° C. for 3 hours. Then, the temperature was elevated to 110° C., and a mixture of 7.4 parts of methyl methacrylate, 3.2 parts of 2-ethylhexyl acrylate and 0.4 part of benzoyl peroxide was added dropwise to the reaction mixture over a period of 2 hours. After passage of 1 hour completion of the dropwise addition, a mixture of 0.1 part of benzoyl peroxide and 1.5 parts of ethylene glycol monobutyl ether was added to the reaction mixture and reaction was carried out at 110° C. for 2 hours. Then, a part of ethylene glycol monobutyl ether was removed by distillation under reduced pressure to obtain an acrylic copolymer solution having a solid content of 64.3%.

(2) A different reaction vessel equipped with a stirrer, a reflux cooler, a thermometer and a dropping funnel was charged with 17.2 parts of the above acrylic copolymer solution, 1.5 parts of 28% aqueous ammonia, 47.1 parts of water, 8.3 parts of 30% aqueous nitrocellulose (SS ¼), 16.1 parts of methyl methacrylate and 6.9 parts of 2-ethylhexyl acrylate, and the mixture was sufficiently stirred to form a dispersion. An aqueous solution of 0.1 part of potassium persulfate in 2.8 parts of water was added to the dispersion and polymerization was carried out at 80° C. for 3 hours. The properties of the so-obtained cellulose derivative-containing emulsion composition and the properties of the coating prepared from this emulsion composition are shown in Table 2.

EXAMPLE 17

(1) In a reaction vessel equipped with a stirrer, a reflux cooler, a thermometer and a dropping funnel, 7.8 parts of toluene was heated at 100° C., and a mixture of 7.4 parts of n-butyl methacrylate, 0.4 part of 2-hydroxyethyl methacrylate and 0.4 part of $\alpha,\alpha'$-azobisisobutyronitrile was added dropwise in a nitrogen atmosphere over a period of 3 hours. After passage of 1 hour from completion of the dropwise addition, a mixture of 0.1 part of $\alpha,\alpha'$-azobisisobutyronitrile and 1.6 parts of toluene was added and polymerization was carried out at 100° C. for 5 hours. The reaction mixture was cooled to 25° C., and a mixture of 15.6 parts of toluene and 1.2 parts of 4,4'-azobis-4-cyanopentanoic acid chloride was added and reaction was carried out for 8 hours. Then, the temperature was elevated to 60° C., and a mixture of 2.2 parts of ethyl acrylate, 5.0 parts of methyl methacrylate, 3.1 parts of acrylic acid and 5.3 parts of 2-ethylhexyl methacrylate was added dropwise over a period of 30 minutes. After completion of the dropwise addition, the temperature was elevated to 80° C. and polymerization was carried out for 5 hours. Then, the temperature was elevated to 100° C. and a mixture of 23.3 parts of ethylene glycol monobutyl ether, 3.3 parts of ethyl acrylate, 7.5 parts of methyl methacrylate, 4.8 parts of acrylic acid, 7.6 parts of 2-ethylhexyl methacrylate, 0.4 part of 2-hydroxyethyl methacrylate and 1.4 parts of benzoyl peroxide was added dropwise to the reaction mixture over a period of 3 hours. After passage of 1 hour from completion of the dropwise addition, a mixture of 0.1 part of benzoyl peroxide and 1.6 parts of ethylene glycol monobutyl ether was added and polymerization was carried out at 100° C. for 3 hours. Then, toluene and a part of ethylene glycol monobutyl ether were removed by distillation under reduced pressure to obtain an acrylic copolymer solution having a solid content of 74.8%.

(2) A different reaction vessel equipped with a stirrer, a reflux cooler, a thermometer and a dropping funnel was charged with 14.8 parts of the above acrylic copolymer solution, 2.1 parts of 28% aqueous ammonia, 48.9 parts of water, 8.3 parts of 30% aqueous nitrocellulose and 23.0 parts of n-butyl methacrylate, and the mixture was sufficiently stirred to form a dispersion. An aqueous solution of 0.1 part of potassium persulfate in 2.7 parts of water was added to the dispersion and polymerization was carried out at 80° C. for 3 hours. The properties of the so-obtained cellulose derivative-containing emulsion composition and the properties of the coating prepared from this emulsion composition are shown in Table 2.

EXAMPLE 18

A reaction vessel equipped with a stirrer, reflux cooler, a thermometer and a dropping funnel was charged with 14.8 parts of the acrylic copolymer solution obtained in Example 17, 51.4 parts of water, 2.1 parts of 28% aqueous ammonia, 5.8 parts of cellulose acetate butyrate (CAB-381 0.1), 22.0 parts of n-butyl methacrylate and 1.0 part of 2-hydroxyethyl methacrylate. The mixture was sufficiently stirred to form a dispersion, and an aqueous solution of 0.1 part of potassium persulfate in 2.7 parts of water was added to the so-obtained aqueous dispersion and polymerization was carried out at 80° C. for 3 hours to obtain a cellulose derivative-containing emulsion composition.

To 95.0 parts of the so-obtained cellulose derivative-containing emulsion was added 5 parts of a water-soluble melamine resin (Smimal M50W supplied by Sumitomo Kagaku K.K.; non-volatile component content=80%) to obtain a clear print. The paint was diluted with water so that the Ford cup #4 flow viscosity was 21 seconds at 23° C., and a tinplate was spray-coated with the dilution and baked and dried at 120° C. for 20 minutes to obtain a smooth, lustrous and hard coating.

rylate, 1.0 part of 2-hydroxyethyl methacrylate, 1.1 parts of N-methylolacrylamide and 3.7 parts of $\alpha,\alpha'$-azobisisobutyronitrile was added dropwise thereto over 2 hours in nitrogen atmosphere. One hour after completion of the addition, 0.4 part of $\alpha,\alpha'$-azobisisobutyronitrile and 3.5 parts of 2-butoxyethanol were further added thereto and the polymerization reaction was carried out at 100° C. for 6 hours.

Then, the temperature of the reaction system was lowered to 70° C. and a mixture of 10.1 parts of n-butyl methacrylate, 0.3 part of glycidyl methacrylate, 0.5 part of $\alpha,\alpha$-azobisisobutyronitrile and 0.2 part of n-dodecylmercaptan was added dripwise to the reaction mixture over 2 hours. Then, the polymerization reaction was carried out at a temperature kept at 70° C. for 8 hours. Thereafter, the reaction system was heated to 140° C. and the reaction was carried out for additional 2 hours to obtain a high-molecular dispersion stabilizer solution having a solid content of 62.4% and an acid value of 82.

18.5 parts of the above high molecular dispersion stabilizer solution, 1.5 parts of 28% aqueous ammonia, 28.8 parts of n-butyl methacrylate and 44.2 parts of water were charged in another reactor provided with a stirrer, reflux condenser, thermometer and dropping device and the whole was stirred thoroughly to obtain a dispersion. To the resulting aqueous dispersion was added an aqueous solution of 0.1 part of potassium persulfate in 6.9 parts of water and the polymerization reaction was carried out at 80° C. for 3 hours. 4.8 parts of Denacol EX-313 (a hydrophilic epoxy compound of Nagase Sangyo Co., Ltd.) was added to 100 parts of the thus obtained emulsion having a solid content of 40.2% and a viscosity of 230 CPS (30° C.) and the whole was

TABLE 2

| Test Items | Example 10 | Example 11 | Example 12 | Example 13 | Example 14 | Example 15 | Example 16 | Example 17 |
|---|---|---|---|---|---|---|---|---|
| Properies of Emulsion | | | | | | | | |
| Solid content (%) | 39.2 | 38.9 | 40.2 | 39.5 | 40.2 | 38.1 | 39.4 | 39.0 |
| Viscosity (cps) | 15 | 40 | 60 | 320 | 160 | 540 | 140 | 540 |
| Standing stability (room temperature, 1 month) | ⊚ | ⊚ | ⊚ | ⊚ | ⊚ | ⊚ | ⊚ | ⊚ |
| (50° C., 7 days) | ⊚ | ⊚ | ⊚ | ⊚ | ⊚ | ⊚ | ⊚ | ⊚ |
| Statilbiyty of addition of water-soluble organic solvent | | | | | | | | |
| 1 isopropyl alcohol (10% solvent/emulsion) | ⊚ | ⊚ | ⊚ | ⊚ | ⊚ | ○ | ⊚ | ⊚ |
| (50% solvent/emulsion) | ▲ | ○ | ⊚ | ○ | ⊚ | ○ | ⊚ | ○ |
| 2 ethylene glycol monobutyl ether (10% solvent/emulsion) | ⊚ | ⊚ | ⊚ | ⊚ | ⊚ | ○ | ⊚ | ⊚ |
| 3 ethylene glycol methyl ether acetate (10% solvent/emulsion) | ⊚ | ⊚ | ⊚ | ⊚ | ⊚ | ○ | ○ | ⊚ |
| Properties of Coating | | | | | | | | |
| Transparency | ⊚ | △ | ⊚ | ⊚ | ⊚ | ○ | ⊚ | ⊚ |
| Gloss | 84 | 70 | 85 | 78 | 85 | 70 | 81 | 83 |
| Hardness | H | H | HB | HB | H | HB | HB | H |
| Non-tackiness | ⊚ | ⊚ | ⊚ | ⊚ | ⊚ | ⊚ | ⊚ | ⊚ |
| Water-resistance | ⊚ | ⊚ | ⊚ | ⊚ | ⊚ | ○ | ⊚ | ○ |
| Adhesion | ⊚ | ⊚ | ⊚ | ⊚ | ⊚ | ⊚ | ⊚ | ⊚ |
| Gasoline resistance | ⊚ | ⊚ | ⊚ | ⊚ | ⊚ | ⊚ | ⊚ | ⊚ |
| Polishing property | ○ | ○ | ⊚ | ○ | ⊚ | ○ | ⊚ | ○ |

EXAMPLE 19

29.3 parts of 2-butoxyethanol (ethylene glycol monobutylether) was charged in a reactor provided with a stirrer, reflux condensor, thermeter and dropping device and heated to 100° C. A mixture of 10.5 parts of acrylic acid, 7.5 parts of ethyl acrylate, 16.9 parts of methyl methacrylate, 15.0 parts of 2-etylhexyl methacmixed well. The mixture was applied to a mild steel plate by means of a No. 30 bar coater and dried at room temperature for three days. Properties of the coating film thus obtained were examined to obtain the results shown in Table 3.

EXAMPLE 20

71.9 parts of xylene was charged in a reactor provided with a stirrer, reflux condenser, thermometer and dropping device and heated to 100° C. 13.4 parts of methyl methacrylate, 5.8 parts of 2-ethylhexyl acrylate, 1.5 parts of thioglycollic acid and 1.4 parts of α,α'-azobisisobutyronitrile were added thereto dropwise over 2 hours in nitrogen atmosphere. Three hours after completion of the addition, 0.3 part of α,α'-azobisisobutyronitrile and 3.3 parts of xylene were further added thereto and the polymerization reaction was carried out at 100° C. for 6 hours.

Then the temperature of the reaction system was elevated to 140° C. and 2.4 parts of glycidyl methacrylate containing 1.5% of hydroquinone was added dropwise thereto over 30 minutes and the reaction was carried out at 140° C. for additional 4 hours. A part of xylene was distilled out under reduced pressure to obtain a solution of a polymer in xylene which had a solid content of 67.4%.

17.1 parts of 2-butoxyethanol was charged in another reactor of the same type as above. It was heated to 100° C. 23.5 parts of the above solution of polymer in xylene, 11.8 parts of methyl methacrylate, 8.7 parts of 2-ethylhexyl acrylate, 7.1 parts of acrylic acid and 1.9 parts of α,α'-azobisisobutyronitrile were added dropwise thereto over 2 hours in nitrogen atmosphere. One hour after the addition, 0.3 part of α,α'-azobisisobutyronitrile and 2.9 parts of 2-butoxyethanol were added thereto and the reaction was carried out at 100° C. for 7 hours. Then, 26.7 parts of water was added to the reaction mixture and part of water and the organic solvent was distilled out to obtain a high-molecular dispersion stabilizer solution having a solid content of 50.4% and an acid value of 64.

To 21.1 parts of the high-molecular dispersion stabilizer solution were added 48.0 parts of water, 0.4 part of 28% aqueous ammonia, 20.2 parts of methyl methacrylate, 8.7 parts of 2-ethylhexyl acrylate and 0.1 part of divinylbenzene and the whole was thoroughly stirred to obtain a dispersion. To the thus obtained aqueous dispersion was added an aqueous solution of 0.1 part of potassium persulfate in 1.4 parts of water and the polymerization reaction was carried out at 80° C. for three hours in nitrogen atmosphere. 4.1 parts of Denacol EX-313 (a hydrophilic epoxy compound of Nagase Sangyo Co., Ltd.) was added to 100 parts of the thus obtained emulsion having a solid content of 39.9% and a viscosity of 160 CPS (30° C.) and the whole was mixed well. The mixture was applied to a mild steel plate by means of a No. 30 bar coater and dried at 60° C. for 100 minutes. Properties of the coating film thus obtained were examined to obtain the results shown in Table 3.

EXAMPLE 21

39.9 parts of 2-butoxyethanol was charged in a reactor provided with a stirrer, reflux condenser, thermometer and dropping device and heated to 100° C. A mixture of 8.1 parts of ethyl acrylate, 18.2 parts of methyl methacrylate, 16.2 parts of 2-ethylhexyl methacrylate, 1.1 parts of 2-hydroxyethyl methacrylate, 1.2 parts of N-methylolacrylamide, 11.3 parts of acrylic acid and 4.0 parts of α,α'-azobisisobutyronitrile was added thereto dropwise over 2 hours in nitrogen atmosphere. After completion of the addition, the temperature was elevated to 120° C. and the reaction was carried out for 6 hours to obtain a carboxylic acid group-containing polymer solution having a solid content of 59.4% and an acid value of 88.

40.1 parts of xylene was charged in another reactor of the same type as above and heated to 80° C. A mixture of 54.9 parts of n-butyl methacrylate, 1.7 parts of glycidyl methacrylate, 0.8 part of n-dodecylmercaptan and 2.5 parts of α,α'-azobisisobutyronitrile was added dropwise thereto over 2 hours in nitrogen atmosphere. After completion of the addition, the reaction was carried out at 80° C. for 8 hours to obtain an epoxy group-containing polymer solution having a solid content of 58.3%.

83.0 parts of the above carboxylic acid group-containing polymer solution was reacted with 17.0 parts of the epoxy-containing polymer solution at 130° C. for 3 hours. Then, part of xylene and 2-butoxyethanol was distilled out to obtain a high-molecular dispersion stabilizer solution having a solid content of 70.3% and an acid value of 73.

To 16.2 parts of the high-molecular dispersion stabilizer solution were added 8.5 parts of 30% water-wet nitrocellulose (SS ¼), 23.6 parts of n-butyl methacrylate, 46.7 parts of water and 1.4 parts of 28% aqueous ammonia and the whole was thoroughly stirred to obtain a dispersion. To the thus obtained aqueous dispersion was added an aqueous solution of 0.1 part of potassium persulfate in 3.5 parts of water and the polymerization reaction was carried out at 80° C. for three hours. 4.5 parts of Denacol EX-313 (a hydrophilic epoxy compound of Nagase Sangyo Co., Ltd.) was added to 100 parts of the thus obtained emulsion having a solid content of 40.1% and a viscosity of 170 CPS (30° C.) and the whole was mixed well. The mixture was applied to a mild steel plate by means of a No. 30 bar coater and dried at room temperature for three days. Properties of the coating film thus obtained are shown in Table 4.

EXAMPLE 22

67.1 parts of xylene was charged in the same reactor as in Example 19 and heated to 100° C. 28.2 parts of n-butyl methacrylate, 1.3 parts of thioglycollic acid and 0.3 part of α,α'-azobisisobutyronitrile were added thereto in nitrogen atmosphere and the polymerization reaction was carried out at 100° C. for 6 hours. Then, 1.8 parts of glycidyl methacrylate and 0.02 part of hydroquinone were added thereto and the reaction was carried out at 140° C. for 4 hours. 17.1 parts of 2-butoxyethanol was added to 23.5 parts of the thus obtained oleophilic polymer solution having a solid content of 62.3% and then, 14.8 parts of methyl methacrylate, 7.1 parts of acrylic acid, 8.0 parts of 2-ethylhexyl methacrylate, 0.7 part of dicyclopentenyl methacrylate and 1.9 parts of α,α'-azobisisobutyronitrile were added dropwise thereto in nitrogen atmosphere while the temperature in the system was kept at 100° C. Three hours after completion of the addition, a mixture of 0.3 part of α,α'-azobisisobutyronitrile and 4.9 parts of 2-butoxyethanol was added thereto and the polymerization reaction was carried out for additional 6 hours. Then, 23.7 parts of water was added thereto and part of water and the organic solvent was distilled out to obtain a high-molecular dispersion stabilizer having a solid content of 55.8% and an acid value of 55.

5.5 parts of the epoxy group-containing polymer solution obtained in Example 21, 48.7 parts of xylene, 7.8 parts of cellulose acetate butyrate (CAB 381-0.1; a product of Eastman Chemical Co.) and 0.1 part of N,N-dimethylbenzylamine were charged in another reactor of the same type as above and the reaction was carried out at 130° C. for 5 hours.

Then, 37.9 parts of the above high-molecular dispersion stabilizer was added to the reaction mixture and part of xylene and 2-butoxyethanol was distilled out to obtain a graft modified cellulose derivative-containing solution having a solid content of 64.2%. 22.4 parts of n-butyl methacrylate, 1.5 parts of 28% aqueous ammonia and 42.8 parts of water were added to 29.3 parts of the above solution and the whole was stirred to obtain a dispersion. An aqueous solution of 0.1 part of potassium persulfate in 3.9 parts of water was added to the aqueous dispersion and the polymerization reaction was carried out at 80° C. for three hours. 3.9 parts of Denacol EX-313 (a hydrophilic epoxy compound of Nagase Sangyo Co., Ltd.) was added to 100 parts of the thus obtained emulsion having a solid content of 40.8% and a viscosity of 560 CPS and the whole was mixed well. The mixture was applied to a mild steel plate by means of a No. 30 bar coater and dried at 60° C. for 100 minutes. Properties of the coating film thus obtained are shown in Table 4.

TABLE 3

| Item | Ex. 1 | Ex. 2 |
|---|---|---|
| Gloss (reflectivity on 60° mirror plane) | 86 | 84 |
| Pencil hardness | HB | 2H |
| Adhesion | ⊙ | ⊙ |
| Water resistance *2 | ⊙ | ⊙ |
| Gasoline resistance | ⊙ | ⊙ |
| Tack-free feeling *4 | ○ | ○ |

*2 Water resistance: The coating film was immersed in water at 20° C. for 24 hours and then dried for 3 hours. Thereafter, the surface condition of the coating film was examined.
*4 Tack-free feeling: Tack-free feeling was evaluated by touching with fingers.

TABLE 4

| Item | Ex. 3 | Ex. 4 |
|---|---|---|
| Stability against a water-soluble organic solvent *5 | | |
| (a) Isopropyl alcohol | ⊙ | ⊙ |
| (b) 2-Butoxyethanol | ⊙ | ⊙ |
| Gloss (reflectivity on 60° mirror plane) | 82 | 85 |
| Pencil hardness | 2H | 2H |
| Water resistance *6 | ⊙ | ⊙ |
| Gasoline resistance | ⊙ | ⊙ |
| Tack-free property *8 | ⊙ | ⊙ |
| Adhesion | ⊙ | ⊙ |
| Abrasion *10 | ⊙ | ○ |

*5 Stability against a water-soluble organic solvent: 5 g of a water-soluble organic solvent was added dropwise to 50 g of a sample and the mixture was stirred for 30 minutes. Then, the sample was applied to a clean glass plate and examined to know whether there was any aggregation.
*6 Water resistance: The coating film was immersed in water at 20° C. for 48 hours and then dried for 3 hours. The surface condition of the coating film was observed.
*8 Tack-free property: The glass plate was maintained horizontally with the coating film upward. A pile of 5 pieces of 50 mm² gauze was placed at the center of the coating film in an airconditioned tank controlled at 50° C. and 90% RH. A weight having a diameter of 40 mm and a flat bottom weighing 500 g was placed at the center of the gauze. Electricity was discharged for 18 hours. Then, the gauze pieces were peeled from the coating film surface and degree of tackiness between the coating film surface and the gauze pieces and a trace of texture on the coating film surface were examined.
*10 Abrasion: The coating film surface was rubbed 10 times with #400 water-resistant abrasive paper and the abrasive paper was examined to know whether there was any deterioration on the paper.

The embodiments of the invention in which an exclusive property or privilege is claimed are defined as follows:

1. An aqueous coating composition comprising a mixture of:
   (A) a hydrophilic epoxy compound having at least two epoxy groups in the molecule, and
   (B) an aqueous dispersion which dispersion has been prepared by emulsion polymerizing, under radical polymerization conditions, at least one radical-polymerizable, ethylenically unsaturated monomer I, in the presence of water and a dispersion stabilizer, said dispersion stabilizer being a high molecular weight polymeric product consisting essentially of a hydrophilic polymer chain portion and an oleophilic polymer chain portion which is highly compatible with the polymer of monomer I, so that said oleophilic polymer chain portion is entangled with the particles of the polymer of said monomer I in the composition, and said hydrophilic polymer chain portion is present in the aqueous phase of the composition, said dispersion stabilizer having functional groups reactive with the epoxy groups of said hydrophilic epoxy compound.

2. An aqueous coating composition as claimed in claim 1 in which the ratio of equivalents of epoxy groups in said hydrophilic epoxy compound A/equivalents of functional groups in aqueous dispersion (B) that are reactive with said epoxy groups is from 0.05 to 2.5.

3. An aqueous coating composition as claimed in claim 2 in which said ratio is from 0.2 to 1.2.

4. An aqueous coating composition as claimed in claim 3 in which said epoxy compound A is selected from the group consisting of ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether, sorbitol polyglycidyl ether and o-cresol novolak epoxy resin.

5. An aqueous coating composition as claimed in claim 3 in which said dispersion stabilizer contains in the hydrophilic polymer chain portion thereof a functional group selected from the group consisting of carboxyl, acid anhydride, carboxylic acid salt, alcoholic hydroxyl, phenolic hydroxyl, N-methylol, primary amino, secondary amino, tertiary amino, amido, sulfonic acid, mercaptan and urethane.

6. An aqueous coating composition comprising a mixture of:
   (A) a hydrophilic epoxy compound having at least two epoxy groups in the molecule, and
   (B) an aqueous dispersion which dispersion has been prepared by emulsion polymerizing, under radical polymerization conditions, at least one radical-polymerizable, ethylenically unsaturated monomer I, in the presence of water and a dispersion stabilizer, said dispersion stabilizer being a high molecular weight polymeric product consisting essentially of a hydrophilic polymer chain portion and an oleophilic polymer chain portion which is highly compatible with the polymer of monomer I, so that said oleophilic polymer chain portion is entangled with the particles of the polymer of said monomer I in the composition, and said hydrophilic polymer chain portion is present in the aqueous phase of the composition, the polymer of monomer I having functional groups reactive with the epoxy groups of said hydrophilic epoxy compound.

7. An aqueous coating composition as claimed in claim 6 in which the ratio of equivalents of epoxy groups in said hydrophilic epoxy compound A/equivalents of functional groups in aqueous dispersion (B) that are reactive with said epoxy groups is from 0.05 to 2.5.

8. An aqueous coating composition as claimed in claim 7 in which said ratio is from 0.2 to 1.2.

9. An aqueous coating composition as claimed in claim 8 in which said epoxy compound A is selected from the group consisting of ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether, sorbitol polyglycidyl ether and o-cresol novolak epoxy resin.

10. An aqueous coating composition as claimed in claim 8 in which said functional group is selected from the group consisting of carboxyl, acid anhydride, carboxylic acid salt, alcoholic hydroxyl, phenolic hydroxyl, N-methylol, primary amino, secondary amino, tertiary amino, amido, sulfonic acid, mercaptan and urethane.

11. An aqueous coating composition as claimed in claim 6 in which the polymer of monomer I is a copolymer of monomer I and a second monomer containing said functional groups.

12. An aqueous coating composition as claimed in claim 1 in which said functional groups are on said hydrophilic polymer chain portion.

* * * * *

UNITED STATES PATENT AND TRADEMARK OFFICE
CERTIFICATE OF CORRECTION

PATENT NO. : 4 521 565
DATED : June 4, 1985
INVENTOR(S) : Hirotaka Toba et al

It is certified that error appears in the above-identified patent and that said Letters Patent is hereby corrected as shown below:

On the title page, item [75]; change the surname of the first inventor from "Toaba" to ---Toba---.

Signed and Sealed this

Thirty-first Day of December 1985

[SEAL]

Attest:

DONALD J. QUIGG

Attesting Officer

Commissioner of Patents and Trademarks